(12) United States Patent
Bao et al.

(10) Patent No.: US 9,043,356 B2
(45) Date of Patent: **\*May 26, 2015**

(54) DOCUMENT PROCESSING METHOD AND SYSTEM

(75) Inventors: Sheng Hua Bao, Beijing (CN); Jie Cui, Beijing (CN); Hui Su, Beijing (CN); Zhong Su, Beijing (CN); Li Zhang, Beijing (CN)

(73) Assignee: International Business Machines Corporation, Armonk, NY (US)

( \* ) Notice: Subject to any disclaimer, the term of this patent is extended or adjusted under 35 U.S.C. 154(b) by 276 days.

This patent is subject to a terminal disclaimer.

(21) Appl. No.: 13/608,309

(22) Filed: Sep. 10, 2012

(65) Prior Publication Data
US 2013/0060808 A1 Mar. 7, 2013

Related U.S. Application Data

(63) Continuation of application No. 12/786,557, filed on May 25, 2010, now Pat. No. 8,359,327.

(30) Foreign Application Priority Data

May 27, 2009 (CN) .......................... 2009 1 0203108

(51) Int. Cl.
*G06F 7/00* (2006.01)
*G06F 17/30* (2006.01)

(52) U.S. Cl.
CPC .... *G06F 17/30716* (2013.01); *G06F 17/30011* (2013.01)

(58) Field of Classification Search
CPC ................... G06F 17/30864; G06F 17/30867; G06F 17/30286; G06F 17/30595; G06F 17/278; G06Q 30/02
See application file for complete search history.

(56) References Cited

U.S. PATENT DOCUMENTS 5,987,460 A 11/1999 Niwa et al.
6,311,198 B1 10/2001 Uramoto et al.
(Continued)

FOREIGN PATENT DOCUMENTS

JP 2006164246 A 6/2006

OTHER PUBLICATIONS

Zhang, et al., Focused Named Entity Recognition Using Machine Learning, SIGIR '04, Jul. 25-29, 2004, Sheffield, South Yorkshire, UK, Copyright 2004 ACM 1-58113-881-4/04/0007, 8 pages.

*Primary Examiner* — James Trujillo
*Assistant Examiner* — Jessica N Le
(74) *Attorney, Agent, or Firm* — Cantor Colburn LLP

(57) ABSTRACT

A method and system for expanding a document set as a search data source in the field of business related search. The present invention provides a method of expanding a seed document in a seed document set. The method includes identifying one or more entity words of the seed document; identifying one or more topic words identifying one or more topic words related to a based entity word in the seed document where the entity word is located; forming an entity word-topic word pair from each identified topic word and the entity word on the basis of which each topic word is identified; and obtaining one or more expanded documents by taking the entity word and topic word in each entity word-topic word pair as key words for web searching at the same time. A system for executing the above method is also provided.

9 Claims, 18 Drawing Sheets

(56) References Cited

U.S. PATENT DOCUMENTS

| | | | |
|---|---|---|---|
| 6,424,971 | B1 | 7/2002 | Kreulen et al. |
| 6,505,197 | B1 * | 1/2003 | Sundaresan et al. ............. 1/1 |
| 6,513,031 | B1 | 1/2003 | Fries et al. |
| 6,567,805 | B1 | 5/2003 | Johnson et al. |
| 6,633,868 | B1 | 10/2003 | Min et al. |
| 7,912,823 | B2 | 3/2011 | Ferrari et al. |
| 8,527,487 | B2 | 9/2013 | Hu et al. |
| 2002/0103799 | A1 | 8/2002 | Bradford et al. |
| 2004/0199495 | A1 * | 10/2004 | Colbath et al. ............. 707/3 |
| 2005/0091205 | A1 | 4/2005 | Sidlosky et al. |
| 2005/0149395 | A1 | 7/2005 | Henkin et al. |
| 2005/0256867 | A1 | 11/2005 | Diab et al. |
| 2006/0136589 | A1 | 6/2006 | Berthold et al. |
| 2006/0230031 | A1 | 10/2006 | Ikeda et al. |
| 2007/0005344 | A1 | 1/2007 | Sandor et al. |
| 2007/0130100 | A1 | 6/2007 | Miller |
| 2007/0179776 | A1 | 8/2007 | Segond et al. |
| 2007/0240911 | A1 | 10/2007 | Yoon |
| 2008/0065655 | A1 | 3/2008 | Chakravarthy et al. |
| 2008/0162456 | A1 | 7/2008 | Daga et al. |
| 2008/0301105 | A1 | 12/2008 | Chen et al. |
| 2008/0319973 | A1 | 12/2008 | Thambiratnam et al. |
| 2008/0319978 | A1 * | 12/2008 | Brun et al. ............. 707/5 |
| 2009/0063469 | A1 | 3/2009 | Gross |
| 2009/0164416 | A1 * | 6/2009 | Guha ............. 707/2 |
| 2009/0319257 | A1 | 12/2009 | Blume et al. |
| 2010/0070506 | A1 | 3/2010 | Whang et al. |
| 2010/0131485 | A1 | 5/2010 | Hu et al. |
| 2010/0180199 | A1 * | 7/2010 | Wu et al. ............. 715/259 |
| 2011/0047156 | A1 | 2/2011 | Knight et al. |
| 2011/0106814 | A1 | 5/2011 | Okato et al. |
| 2011/0231347 | A1 | 9/2011 | Xu et al. |

* cited by examiner

建华数码产业生机迸发 秋季攻势主推笔记本DVD

建华 数码 产业 生机 迸发 秋季 攻势 主推 笔记本 DVD

建华/n 数码/n 产业/n 生机/n 迸发/v 秋季/t 攻势/n 主推/v 笔记本/n
DVD/n

建华 数码 产业 生机 迸发 秋季 攻势 主推 笔记本 DVD

| Feature | Total appearing times | Whether appear in title | Result value | Threshold | Result |
|---|---|---|---|---|---|
| weight | 0.1 ($w_1$) | 0.5 ($w_2$) | | 0.5 | |
| 建华 | 5 ($x_1$) | 1 ($x_2$) | 1 | >0.5 | Entity word |
| 中山 | 1 ($x_1$) | 0 ($x_2$) | 0.1 | <0.5 | Non entity word |
| 张三 | 1 ($x_1$) | 0 ($x_2$) | 0.1 | <0.5 | Non entity word |

FIG. 5E

建华 数码/n 产业/n 生机/n 攻势/n 笔记本/n DVD/n

| Feature | Total appearing times | Whether appear in title | Minimum distance from the entity word | Times of the entity word and topic word appearing in the same sentence | Result value | Threshold value (derived through machine learning) | Result |
|---|---|---|---|---|---|---|---|
| weight | 0.1 (w1) | 0.3 (w2) | -0.2 (w3) | 0.1 (w4) | 1 | 0.5 | |
| 数码 | 7 | 1 | 0 | 5 | 1.5 | >0.5 | Topic word |
| 公司 | 3 | 0 | 2 | 0 | -0.1 | <0.5 | Entity word |
| 产业 | 2 | 1 | 1 | 1 | 0.4 | <0.5 | Non entity word |
| 科技 | 2 | 0 | 1 | 0 | 0.0 | <0.5 | Non entity word |

FIG. 5G

JIANHUA TV Ranked the First in Home Appliance Retail Outlets

On 23 February 2006, the 2005 China Home Appliance Brand Retailing Competition Conference conducted by the information consultative department of China Home Appliances Association was held in Beijing. According to the monitoring report, JIANHUA TV was listed in the top ones in marketing share, sales outlets distribution, products exhibition, sales promotion, salesman performance, and product price, etc. With the comprehensive advantages, JIANHUA TV ranked the first in the television industry and was honorably named as the Top Brand in China Home Appliance Retail Outlets.

FIG. 6A

JIANHUA/n  TV/n Ranked/v the/w First/n in/w Home/n Appliance/n Retail/a Outlets/n On/w 23/m  February/n  2006/m , the/w 2005/m  Home/n Appliance/n Brand/w Retailing/n Competition/n Conference/n conducted/v by/w the/w information/n consultative/a department/n    of/w China/n Home/n Appliances/n Association/n was/v held/v in/w Beijing/n    ./w According/v to/w   the/w monitoring/v report/n    ,/w JIANHUA/n TV/n was/v listed/v in/w   the/w top/a ones/n in/w marketing/n share/n    ,/w sales/n outlets/n distribution/n    ,/w products/n exhibition/n ,/w sales/n promotion/n    ,/w salesman/n performance/n , and/w product/n   price/n    ,/w etc/w    ./w With/w   the/w comprehensive/a advantages/n    ,/w JIANHUA/n TV/n ranked/v the/w first/a in/w the/w television/n industry/n and/w was/v honorably/a named/v    as/w the/w Top/a Brand/n   in/w China/n   Home/n Appliance/n   Retail/a   Outlets/n   ./w

FIG. 6B

JIANHUA TV/n Ranked/v the/w First/n in/w Home/n Appliance/n Retail/a Outlets/n

On/w 23/m  February/n  2006/m , the/w 2005/m  Home/n Appliance/n Brand/w Retailing/n Competition/n Conference/n conducted/v by/w the/w information/n consultative/a department/n    of/w China/n Home/n Appliances/n Association/n was/v held/v in/w Beijing/n    ./w According/v to/w   the/w monitoring/v report/n    ,/w JIANHUA/n TV/n was/v listed/v in/w   the/w top/a ones/n in/w marketing/n share/n    ,/w sales/n outlets/n distribution/n    ,/w products/n exhibition/n ,/w sales/n promotion/n    ,/w salesman/n performance/n , and/w product/n   price/n    ,/w etc/w    ./w With/w   the/w comprehensive/a advantages/n    ,/w JIANHUA/n TV/n ranked/v the/w first/a in/w the/w television/n industry/n and/w was/v honorably/a named/v    as/w the/w Top/a Brand/n   in/w China/n   Home/n Appliance/n   Retail/a   Outlets/n   ./w

FIG. 6C

| feature | Total appearing times | Whether appear in title | result value | threshold | result |
|---|---|---|---|---|---|
| weight | 0.1 ($w_1$) | 0.5 ($w_2$) | | 0.5 | |
| JIANHUA | 3 | 1 | 0.8 | >0.5 | Entity word |
| China | 2 | 0 | 0.2 | <0.5 | Non entity word |
| Beijing | 1 | 0 | 0.1 | <0.5 | Non entity word |

FIG. 6D

*JIANHUA* TV/n   First/n Home/n Appliance/n Outlets/n

February/n   Home/n Appliance/n Retailing/n Competition/n Conference/n   information/n
department/n   Home/n Appliances/n Association/n   report/n   *JIANHUA*/n TV/n   ones/n
marketing/n share/n   sales/n outlets/n distribution/n   products/n exhibition/n   sales/n promotion/n
salesman/n performance/n   product/n   price/n etc/w advantages/n   *JIANHUA*/n TV/n television/n
industry/n   Brand/n   Home/n   Appliance/n   Outlets/n

FIG. 6E

| Feature | Total appearing times | Whether appear in title | Shortest distance from the entity word | Times of pair appearing in the same sentence | Result value | Threshold value | Result |
|---|---|---|---|---|---|---|---|
| weight | 0.1 ($w_1$) | 0.3 ($w_2$) | -0.2 ($w_3$) | 0.1 ($w_4$) | | 0.5 | |
| Home | 4 | 1 | 2 | 1 | 0.4 | <0.5 | Non topic word |
| Appliance | 4 | 1 | 3 | 1 | 0.2 | <0.5 | Non topic word |
| TV | 3 | 1 | 2 | 3 | 0.9 | >0.5 | Topic word |
| Outlet | 2 | 1 | 4 | 1 | -0.2 | <0.5 | Non topic word |
| Exhibition | 1 | 0 | 8 | 1 | -1.4 | <0.5 | Non topic word |

FIG. 6F

DOCUMENT PROCESSING METHOD AND SYSTEM

CROSS REFERENCE TO RELATED APPLICATION

This application is a continuation of U.S. patent application Ser. No. 12/786,557, filed May 25, 2010, which claims priority under 35 U.S.C. §119 to Chinese Patent Application No. 200910203108.X filed May 27, 2009, the entire contents of which are incorporated herein by reference.

BACKGROUND OF THE INVENTION

1. Field of the Invention

The present invention relates to a document processing technique, and more particularly, relates to a method and system for expanding a document set as a search data source in the enterprise search field.

2. Description of the Related Art

Today's enterprises have increasing types of electronic documents and data information. How to utilize such information to help an enterprise's business development and strategy decisions has attracted great attention. Enterprise search technology provides an effective way to help enterprises process such ever increasing data information. However, not all data are suitable as a search data source in an enterprise search.

The traditional information source upon which the search of a general search engine is based is a mass information source. The search result is also mass data information. A great number of search results may not be desired by a user, and the enterprise search user can seldom obtain the desired information by eliminating noise from such mass data information. Thus, in the enterprise search field, for a particular business demand such as performing market analysis on an industry or determining an enterprise for investment, it is impossible to collect all the Web data for performing a search due to limitation of resources. However, as much relevant information as possible must be acquired.

With the expeditious increase of Internet based documents, the data source for an enterprise search must be constantly updated and extended. Thus, a significant challenge in the field of enterprise search technology is to effectively and automatically extend the search data source for enterprise search services to help an enterprise collect information useful to businesses from a mass of web data. This will help eliminate unnecessary "noisy" information to promote data source utility and save storage resources for the search data source.

In the related art, a user of an enterprise search service recommends relatively valuable documents which he or she obtained from an enterprise search service system. The documents were stored in an information memory device of the enterprise search service system and then became a public enterprise search data source. Further, a system administrator for the enterprise search service keeps a close eye on the change of web information at any moment and adds useful information to the enterprise search data source. However, the above manners of expanding search data source cannot automatically implement expansion based on the existing documents in the data source for enterprise search, which is totally dependent on actions of users of the enterprise search service and the system administrator. This not only consumes time and energy but also has low efficiency in expanding the data source.

SUMMARY OF THE INVENTION

It is desired to provide a technical solution capable of automatically expanding documents without requiring a considerable amount of manual work while maintaining the precision and accuracy of document expansion.

According to an aspect of the present invention, there is provided a document processing method. The method includes: identifying by a processor, based on each identified entity word, one or more topic words related to each of the one or more identified entity words, the one or more identified topic words located in the seed document; forming, by the processor, an entity word-topic word pair from each of the one or more identified topic words and each of the one or more identified entity words upon which each of the one or more identified topic words is identified; and obtaining one or more expanded documents by the processor by taking the entity word and topic word in each entity word-topic word pair as key words for web searching at the same time, wherein the expanded documents include not only the entity word in the each entity word-topic word pair but also the topic word in the each entity word-topic word pair.

According to another aspect of the present invention, there is provided a system for expanding a seed document in a seed document set. The seed document set includes at least one seed document and the system includes: entity word identifying means for identifying one or more entity words of the seed document I memory by a processor, the one or more identified entity words being words indicating focused entities of the seed document; topic word identifying means for identifying by the processor, based on each of the one or more identified entity words of the seed document, one or more topic words related to each of the one or more identified entity words, the one or more identified topic words located in the seed document; pairing means for forming, by the processor, an entity word-topic word pair from each of the one or more identified topic words and each of the one or more identified entity words upon on which each of the one or more identified topic words is identified; and document expanding means for obtaining one or more expanded documents by the processor by taking the entity word and topic word in the each entity word-topic word pair as key words for web searching at the same time, the expanded documents including not only the entity word in each entity word-topic word pair but also the topic word in the each entity word-topic word pair.

According to the methods and systems of the present invention, expanding or filtering the existing documents can be performed automatically, without consuming a considerable amount of manual work. Moreover, such expanding or filtering is based on performing entity word-topic word analysis to existing documents, which improves the basis nature and accurateness of document expansion or filtering.

Different from a traditional search engine which is dependent on data expansion performed by super links between web pages, the focused information of an enterprise generally has specific entities and relevant topics. Thus, the technical solution as proposed here mainly uses the focused entities in an article's content and the analysis on the topics to further explore the enterprise user's demand on information, thereby performing automatic expansion of documents.

BRIEF DESCRIPTION OF THE DRAWINGS

FIGS. 5A-5G are diagrams of each procedure of the process of performing entity word and topic word identification on a Chinese document;

FIGS. 6A-6F are diagrams of each procedure of the process of performing entity word and topic word identification on an English document;

DETAILED DESCRIPTION OF THE PREFERRED EMBODIMENTS

Hereinafter, the preferred embodiments of the present invention will be described with reference to the accompanying drawings.

Figure 1:
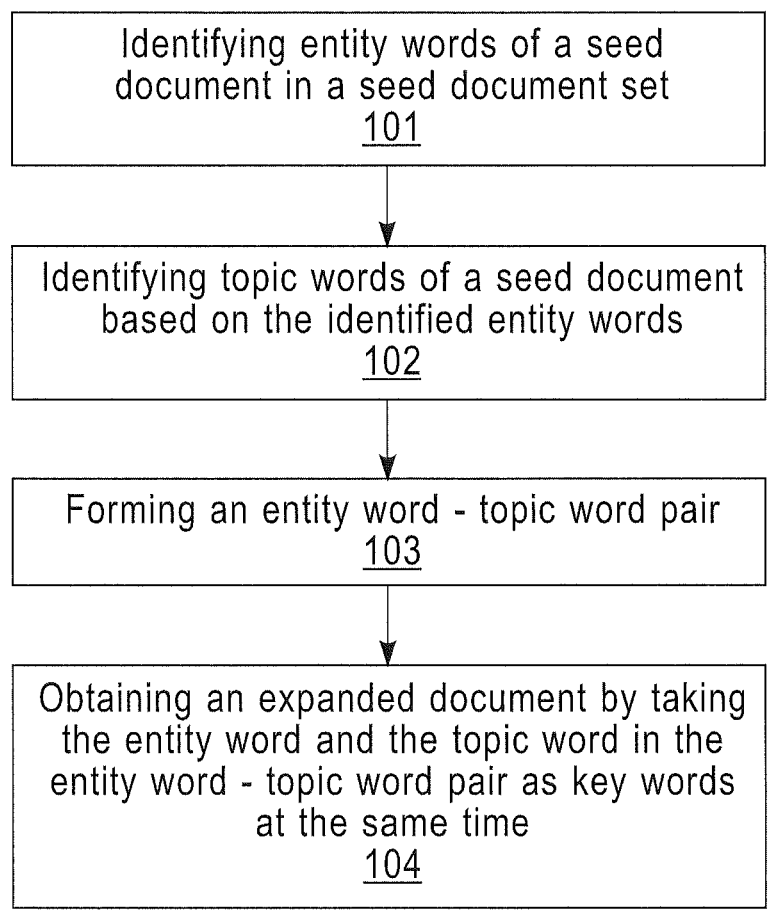
FIG. 1 shows a flow chart of a document processing method according to the present invention.

FIG. 1 shows a flow chart of a document processing method according to the present invention. The method starts at step 101. Operations of the steps 101-104 are performed on each seed document in a seed document set. At the step 101, entity words of the seed document are identified. A seed document set is a document set comprising at least one seed document, and the seed document refers to a document that is determined to be subject to an expansion operation. In other words, all documents comprised in a seed document set must be subject to the operations of the steps 101-104. The seed documents in a seed document set may be physically stored in the same memory device or in different memory devices. Even though a certain document and a seed document are physically stored in the same memory device or are obtained in a common manner such as by recommended by users of an enterprise search service, if it is not required to perform the expansion operations as shown in the steps 101-104 on the certain document, the certain document cannot be regarded as a seed document and thus is not included in the seed document set.

A seed document comprised in a seed document set may be recommended by users of an enterprise search service. After a user reads a document which he thinks is valuable locally or from a remote server through the web, he or she may recommend the document to the enterprise search server. The document is thereby saved in the seed document set. Those skilled in the art may appreciate that the user recommendation is only one way of generating a seed document set, and the other ways may be adopted to generate a seed document set, for example imported automatically from other database.

An entity word is a word contained in a document and refers to one or more focused named entities in an article. For each article, one or more entity words can be identified. Entity words in a document may be identified with the focused named entity recognition technology (FNER), and the method for using the FNER technology to identify entity words will be specifically shown and explained accordingly in FIG. 2. In response to the entity words identified in the seed document at step 101, the topic words of the seed document are identified at step 102 based on the identified entity words.

The topic words are words different from the entity words, which indicate important topics associated with the identified entity words in an article and have a certain part of speech, in most cases a noun or verb. Like the entity words, the topic words are also words in a document. It should be emphasized that a topic word is associated with an entity word. A topic word must be identified based on an entity word identified from a document. Though a variety of parameters need to be introduced in the process of identifying topic words, the associations of other words than the entity words identified in an article with the entity words are significant and indispensible parameters in the process of identifying the topic words.

The topic words in a document may be identified through a focused topic detection technology (FTD). The method of using the FTD technology to identify topic words will be shown and explained accordingly in FIG. 3.

Figure 3:
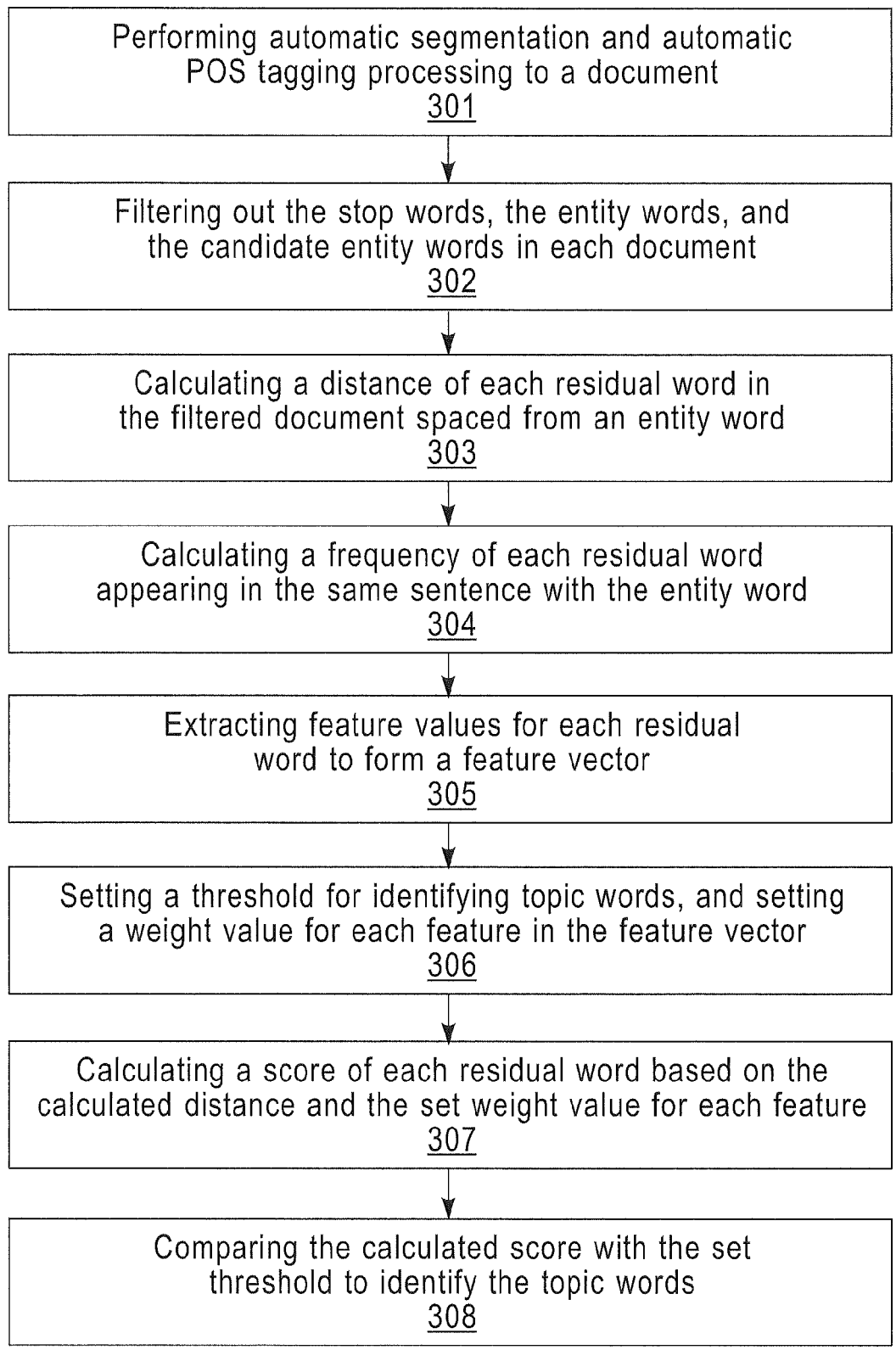
FIG. 3 shows a flow chart of a method of identifying topic words in a document with focused topic detection technology FTD.

Those skilled in the art may appreciate how parameters associated with entity words are introduced during the process of identifying topic words from the FTD flow chart as shown in FIG. 3 and the corresponding literal description, so as to embody the correlation between the identified topic words and entity words. It should be further pointed out that one or more topic words may be identified based on a same identified entity word, because in a document, there may be a plurality of topic words associated with an entity word of the document. It should be further emphasized that the topic words correspond to the entity words. Specifically, a plurality of entity words may be identified for a same document, and then topic words are identified in the document based on each identified entity word, respectively.

Through the steps 101 and 102, the entity words and topic words in each document in a seed document set have been identified. At the step 103, each topic word as identified and the entity word as the basis for identifying each topic word form an entity word-topic word pair. In particular, the manner of forming an entity word-topic word pair at step 103 should be noted. Since a seed document set may comprise a plurality of documents and each document may further comprise a plurality of entity words and a plurality of topic words to be identified, it is not the case that all identified entity words and topic words in a document in a seed document set form pairs randomly, but that each identified topic word and the entity word as the basis for identifying the topic word form an entity word-topic word pair. An example is shown in table A (document 1, document 2 and document 3 are all seed documents in a seed document set):

TABLE A

|  | Document No. | | | | | | | |
| --- | --- | --- | --- | --- | --- | --- | --- | --- |
|  | Document 1 | | | Document 2 | | Document 3 | | |
| Entity Words | A1 | A2 | A3 | A4 | A5 | A1 | | |
| Topic Words | B1 | B1 | B2 | B3 | B4 | B5 | B2 | B5 |

From Table A, it is seen that the three entity words as identified in document 1 at step 101 are: A1, A2, and A3, respectively. Based on the entity word A1, the topic word B1 corresponding to A1 is identified at step 102, the topic word B1 corresponding to A2 is identified at step 102; and based on the entity word A3, two topic words B2 and B3 corresponding to A3 are identified at step 102, respectively. Likewise, the entity words and topic words of document 2 and document 3 are also identified. Then, the entity word-topic word pairs that can be formed by the above identified entity words and topic words at step 103 are the following 8 pairs: A1-B1, A2-B1, A3-B2, A3-B3, A4-B4, A5-B5, A1-B2, and A1-B5. However, an entity word-topic word pair such as A4-B5 can not be formed, because B5 is identified based on the entity word A5, not based on the entity word A4.

From Table A, it can also be seen that a plurality of entity words may be identified in a same document (for example A4 and B5 identified in document 2), a plurality of topic words may be identified based on a same entity word (for example, two topic words B2 and B5 identified in document 3 based on the entity word A1), and a same entity word can be identified in different documents (for example the entity word A1 can be identified both in document 3 and document 1).

At the step 104, taking the entity word and topic word in each formed entity word-topic word pair as key words at the same time, one or more expanded documents are obtained through web search. An expanded document set comprising one or more expanded documents is thereby generated from the seed document set. With A1-B 1 which can form an entity word-topic word pair in table 1 as an example, a new document is searched and downloaded through the web with A1-B1 as key words (during the search process, A1 and B1 have a relationship "and", not "or"), and the downloaded new document not only comprises A1 but also comprises B1. Thus the downloaded new document forms an expanded document set.

Figure 4:
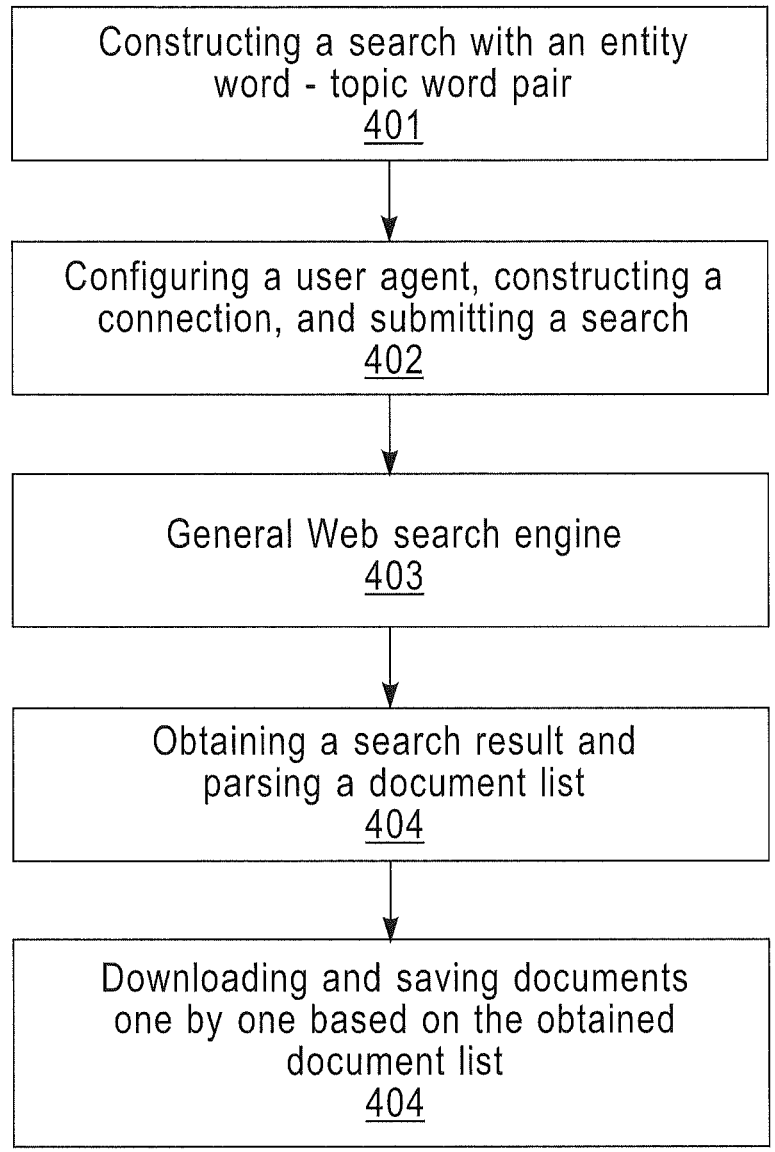
FIG. 4 shows an architecture diagram of a general search engine-based web crawler according to an embodiment of the present invention.

It should be noted that various manners can be adopted to implement the process of automatically searching and downloading new documents through web. For example new documents can be downloaded through the web crawler technology-based general search engine architecture. FIG. 4 shows a diagram of the architecture of a general search engine-based web crawler.

To sum up, through the steps 101-104 in FIG. 1, a seed document set can be expanded as a seed document set plus expanded document set, thereby achieving a technical effect of automatically expanding the original search data source document in the enterprise search service field.

Figure 2:
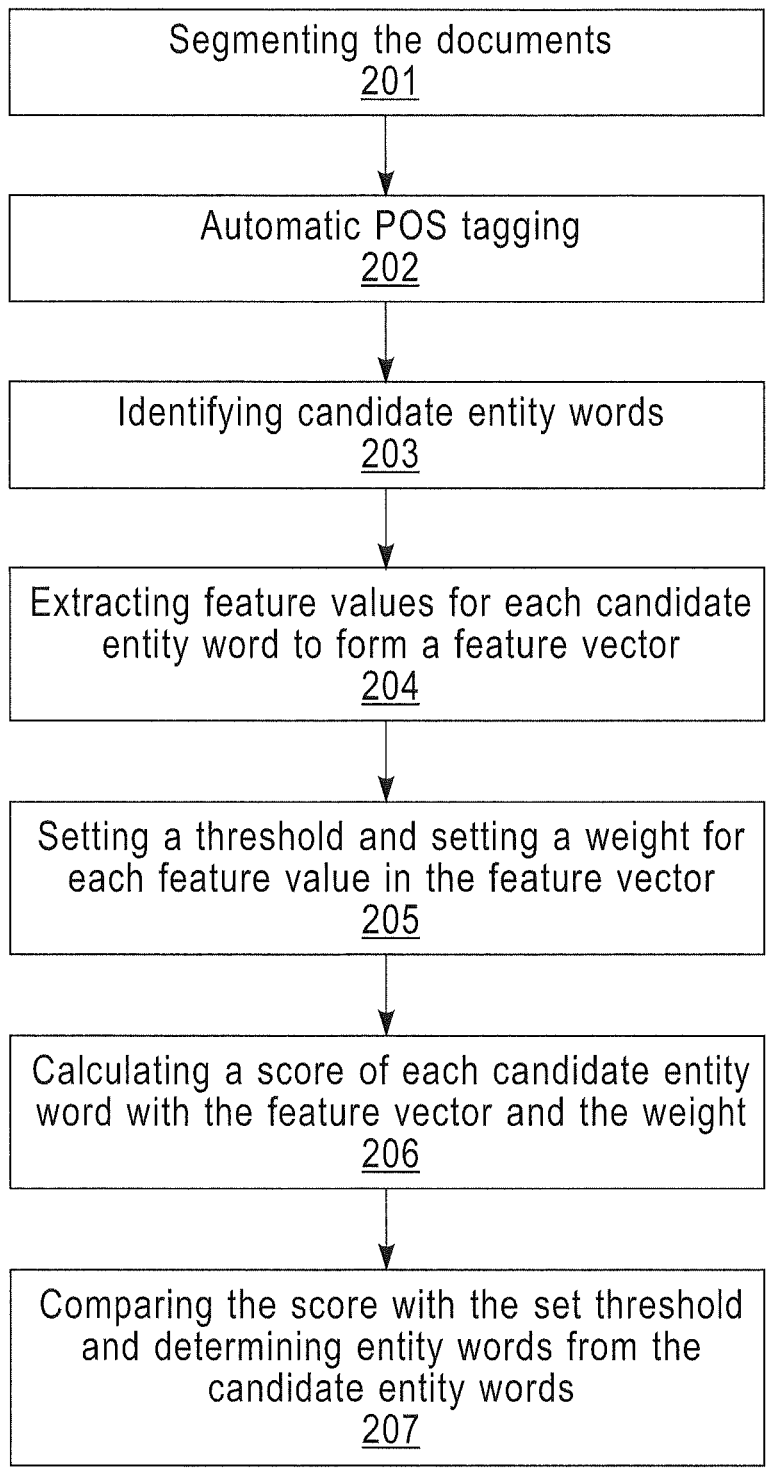
FIG. 2 shows a flow chart of a method of identifying entity words in a document with focused named entity recognition technology FNER.

FIG. 2 shows a flow chart of a method of identifying entity words in a document with a FNER technology. For a given document, the automatic segmentation processing is performed at step 201, that is, segmenting the words comprised in a document one by one. Methods such as the maximum match method (MM method), the reverse maximum match method (OMM method), the word-by-word traversing match method, and the segmentation mark establishment method can be used for performing the automatic segmentation processing.

After the automatic segmentation processing ends, the automatic POS tagging is performed at step 202, the POS indicating the part of speech of a word, such as noun, verb, preposition, or adjective. The automatic POS tagging can automatically tag POS to the words in a document through a computer based on probability statistics and based on a rule. In particular, common methods such as CLAWS and VOLSUNGA in the art can be used for the automatic POS tagging. The automatic POS tagging processing may result in tagging a noun as n, tagging a verb as v, tagging an adjective as a, and tagging a number as m.

At step 203, candidate entity words are identified. It should be emphasized that an entity word refers to a word representing a name of a person, a name of an address, or a name of an organization. An entity word must be a noun, that is, it is the word tagged as noun (n) at step 202. The technology for identifying candidate entity words is mainly to extract features of each word in an article, for example, a preceding word and a following word, respective part of speech of the preceding and following words, and whether the word appears in a semantic dictionary such as the name of a person, name of an address, and prefix and affix of the name of an organization.

Then, the classification determination is performed based on a statistical model of entity identification, such that a word exceeding a threshold is determined as a candidate entity word. In this way, the entity words are distinguished from normal nouns. On the basis of obtaining the candidate entity words, a series of features are extracted from each candidate entity word at step 204, where the feature values of a series of features extracted from each candidate entity word form a feature vector. For example, e is a candidate entity word identified in a document, and if m number of features are extracted with regard to the entity word, the feature vector of the candidate entity word e can be expressed as $X=\{x_1, x_2, \ldots, x_m\}$. The extracted features about the candidate entity word may be a frequency of the candidate entity word appearing in an article, whether the candidate entity word appears in the title, whether its left neighboring and right neighboring words are other candidate entity words, and the distribution of the candidate entity word in the document, etc.

At step 205, a threshold is set and a weight for each feature value in the feature vector is set. It should be pointed out that the threshold and the weight for each feature value are typically set at step 205 in a machine learning manner. Generally speaking, the process of machine learning algorithm is as follows: first, preparing some manually tagged training sample sets such as each class includes a certain number of examples belonging to this class; extracting features according to a specific method, wherein due to difference in classification scenarios and data, the classification features extracted are also different from one another; and finally, the machine learning algorithm reads features of each training sample, and derives a classification model, that is, the weight of each feature, or the contribution degree of the feature to the classification, through certain learning criteria. For example, the spatial partition distance between a positive sample and a negative sample is the maximum, or the classification error is minimum. Then the training process ends.

Like the training process, during the online classification, features are extracted from a sample with an unknown class. Then, the similarity degree of the sample to each class is computed based on the classification model derived in the training process, and the final classification is determined based on a preset threshold. The currently widely applied machine learning algorithms are as follows; Naïve-Bayes algorithm, Decision Tree algorithm, and Support Vector Machines algorithm, wherein the Support Vector Machines algorithm is currently a well-known best classification algorithm which can achieve the best classification precision rate.

At step 206, the following formula is used to calculate the score (x) of each candidate entity word:

$$\text{score}(x) = b + \sum_{j=1}^{m} (w_j * x_j)$$

wherein b represents the threshold set at step 205, $w_j$ represents the weight of the feature $x_j$, $w_j$ can be a positive value or a negative value; when $w_j$ is a negative value, it indicates that it has a negative effect for selecting the candidate entity words with a feature $x_j$ as entity words. After calculating the score of the candidate entity word according to the above formula at step 206, the score derived at step 207 is compared with the threshold set at step 205, and if the value of the score (x) is greater than 0, the candidate entity word is identified as an entity word, and if the value of the score (x) is smaller than 0, then the candidate entity word is not identified as an entity word. Until now, the same processing and determination is performed on each candidate entity word identified at step 203, so as to identify the entity words in the document.

FIG. 3 shows a flow chart of a method for identifying topic words in a document based on the identified entity words using the focused topic detection (FTD) technology. At step 301, the document whose entity words have been identified is subject to the automatic segmentation and automatic POS tagging processing. It should be noted that in order to show schematically a complete FTD flow, step 301 is added in FIG. 3. In fact, step 301 has been implemented in the FNER flow as shown in FIG. 2, thus it is unnecessary for reimplementation in the FTD flow, and thus it is completely feasible to directly use the processing result of automatic segmentation and automatic POS tagging in the FNER flow.

At step 302, the stop words, the entity words and the candidate entity words in the document are filtered. Here, the entity words to be filtered are those entity words identified in the FNER flow as shown in FIG. 2, while the stop words refer to those words that can not be topic words, for example: adjectives such as beautiful or excellent and adverbs such as "of". Preferably, the topic words are nouns. Less preferably, topic words may also be verbs. The result of automatic POS tagging may be used to implement filtering at step 302.

At step 303, a distance between each residual word and an entity word in a filtered document is calculated. The residual words refer to the words left in the document after filtering. The distance between a residual word and an entity word refers to the number of words spaced between the residual word and the entity word, and here, during calculating the number of words spaced, the entity words, the candidate entity words and the stop words that have been filtered shall be counted. The basis for such practice is that, generally, the average distance between a topic word and an entity word is smaller than the average distance between a non-topic word and an entity word. At step 304, the frequency of each residual word and an entity word appearing in a same sentence in a filtered document is calculated.

Those skilled in the art may appreciate that step 303 and step 304 embody that topic words are correlated with entity words, that is, the topic words are identified based on specific, identified entity words. It should be particularly pointed out that step 303 and step 304 are only two exemplary parameters embodying the relationship between topic words and entity words, and parameters capable of embodying the relationships between the topic words and entity words may further have a plurality of kinds, such as, the frequency of an entity word and a topic word appearing in a same paragraph at the same time, the frequency of an entity word and a topic word appearing in a designated distance range, the frequency of an entity word and a topic word appearing in a subtitle and the content affiliated to the subtitle in a document at the same time.

The so-called "frequency of an entity word and a topic word appearing within a designated distance range" refers to the times a topic word appears within a specific distance, for example 3 words, spaced from an entity word. If a word appears within 3 words spaced from the identified topic word, whether it is two words or one word, the feature value can obtain the same weight and score, with no further distinguishing within a specific distance. The so-called "frequency of an entity word and a topic word appearing in a subtitle and the content affiliated to the subtitle in a document at the same time" refers to a situation in which in some web document, besides a main title, there are a plurality of subtitles, and each subtitle is attached with a segment of content regarding the subtitle. Thus the frequency of an entity word and a topic word appearing in the subtitle and the content affiliated to the subtitle in a document at the same time can also embody the relationship between the entity word and the topic word.

To sum up, the relationship between entity words and topic words can be embodied by a plurality of parameters (feature values), to thereby embody the "dependency relationship" of topic words based on the identified entity words. Besides the above enumerated plurality of parameters, excluding the feature values, any parameter employed by those skilled in the art, as long as it can embody the relationship between entity words and topic words, that is, identifying topic words based on the identified entity words, falls into the protection scope of the present invention.

At step 305, feature values of each residual word are extracted to form a feature vector thereof. The features extracted at step 305 comprise the distance and frequency derived at step 303 and step 304, as well as other features of the residual word irrelevant to the entity word, for example, frequency of residual words appearing in the document, lengths of residual words, and the number of documents including the residual words in a document set having the same identified entity words.

At step 306, a threshold for identifying the topic word is set, and a weight value for each feature in the feature vector is set. Like at step 205 of setting a threshold for identifying entity words and setting a weight for each feature value in the feature vector, at step 306, a threshold for identifying topic words and a weight value for each feature in the feature vector are also set in a machine learning manner. At step 307, for each residual word, a score is calculated based on the set weight value and feature vector $Y=\{y_1, y_2, \ldots, y_m\}$. The calculation formula is:

$$\text{score}(y) = c + \sum_{j=1}^{m} (w_j * y_j)$$

wherein c represents the threshold as set at step 306, $w_j$ represents the weight of the feature $y_j$, $w_j$ can be a positive value or a negative value; when $w_j$ is a negative value, it indicates that it has a negative effect for selecting the residual words with a feature $y_j$ as topic words. After calculating the score of the residual word according to the above formula at step 307, the score derived at step 308 is compared with the threshold set at step 306, and if the value of the score (y) is greater than 0, the residual word is identified as a topic word, and if the value of the score (y) is smaller than 0, then the residual word is not identified as a topic word. By far, each residual word is subject to the same processing and determining, with the topic words in the document corresponding to the previously identified entity words being filtered out and identified.

Hereinafter, an instance for identifying entity words in a specific Chinese document and for identifying topic words based on the identified entity words is described:

1. Using FNER Technology to Realize Identification of Entity Words

Step 1 Automatic Segmentation and Automatic POS Tagging

Figures 5A, 5B:
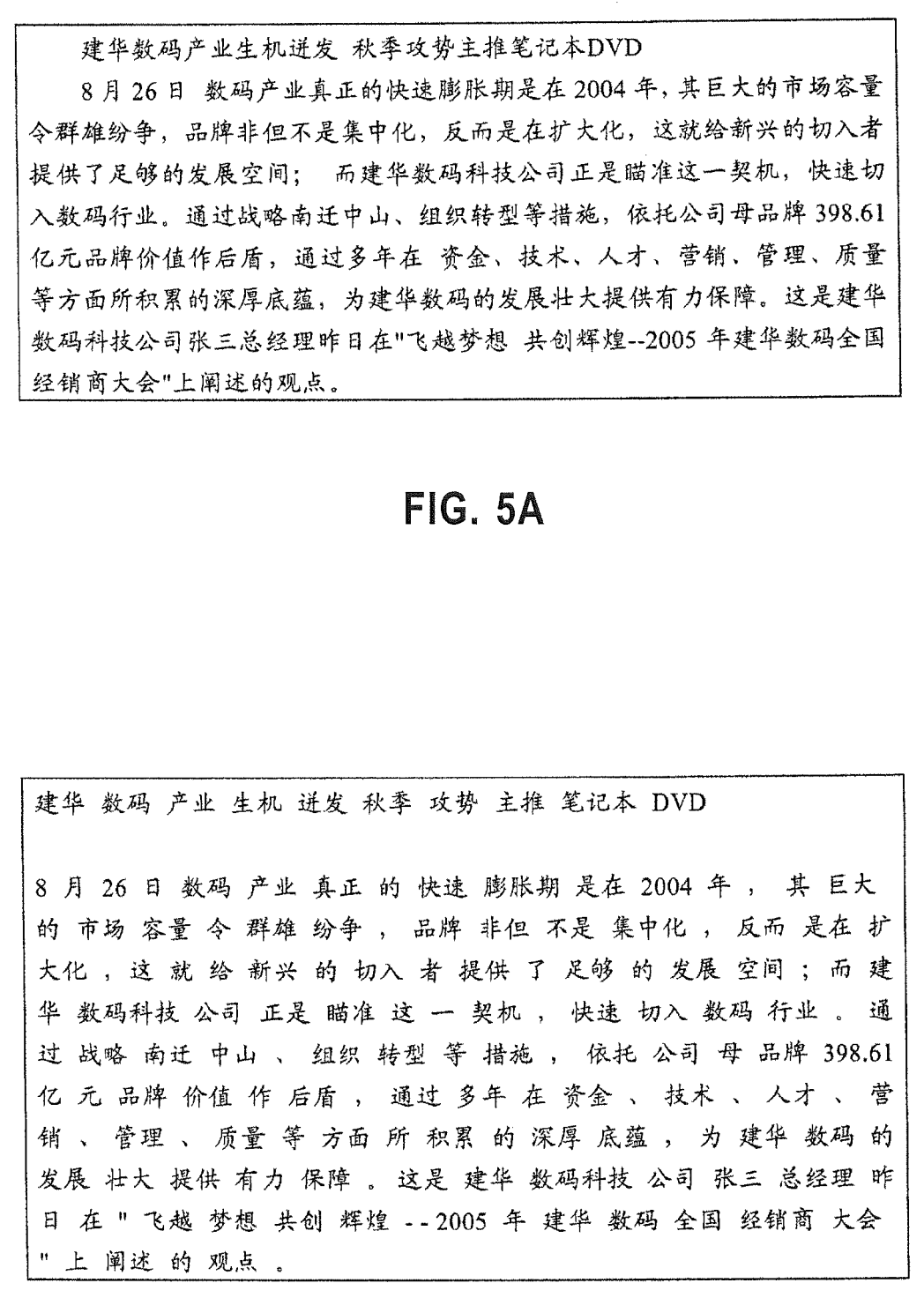
Figure 5C:
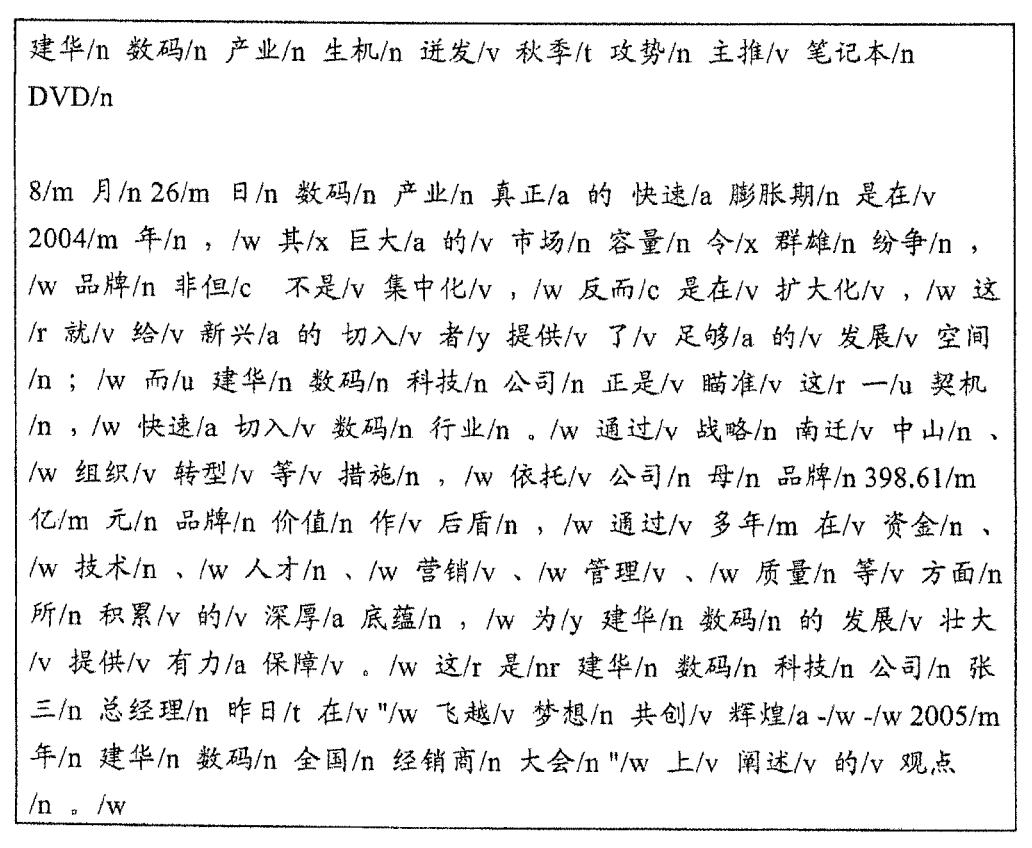

Assume a given Chinese document is shown in FIG. 5A. The effect after segmenting the document with a program is shown in FIG. 5B, and the effect after automatic POS tagging with a program is shown in FIG. 5C, wherein /n indicates a noun, /v indicates a verb, /a indicates an adjective, /m indicates a number.

Step 2 Identifying Candidate Entity Words

Figures 5D, 5E:
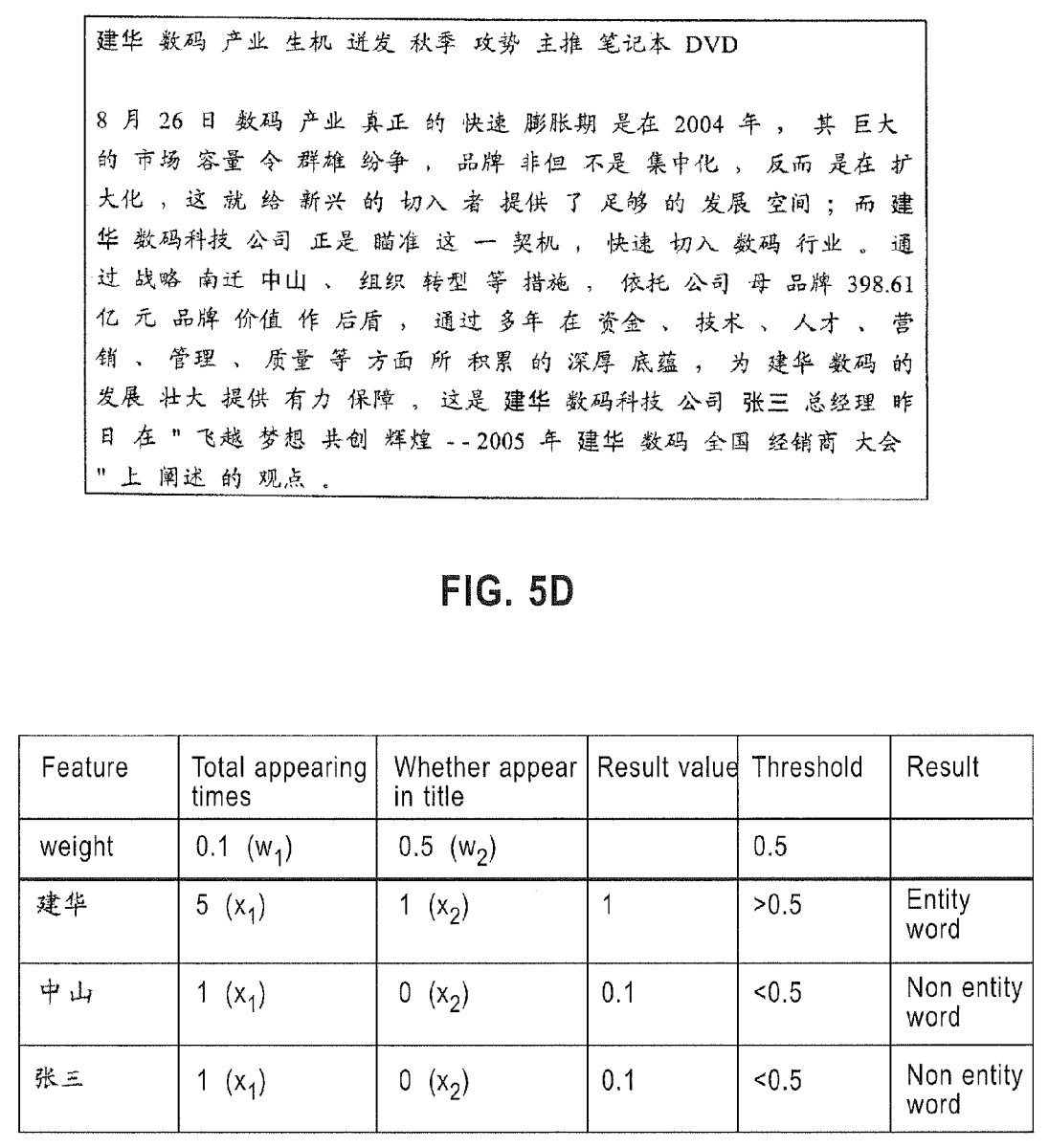

As shown in FIG. 5D, the extracted candidate entity words include a company name "建华(JIANHUA)" which is determined based on the neighboring "数码(digital)" and "公司(company)", an address name determined from the neighboring "南江(Nan Qian)" and a person name "张三(Zhang San)" determined from the neighboring "总经理(manager)." These candidate entities are expressed in bold lines in FIG. 5D.

Step 3

For each candidate entity word, a series of features are extracted. For example, a frequency of the candidate entity word appearing in the article, whether it appears in the title, whether its left neighboring and right neighboring words are candidate entity words, and the distribution of the candidate entity word in the article.

For example the statistics on the features only considering frequency information is as follows:

建华(JIANHUA): once in the title, 4 times in the text
中山(Zhongshan): once in the text
张三(Zhang San): once in the text Step 4

Based on the candidate entity words as identified in step 3, FNER classification model, derived through the machine learning, is applied to the feature vector $X=\{x_1, x_2, \ldots, x_m\}$ for each candidate entity word, thereby obtaining an estimate score (probability). If the estimate score is greater than the set threshold, the candidate entity word is determined as an entity word.

The following formula is used to calculate the score (x) of each candidate entity word:

$$\text{score}(x) = b + \sum_{j=1}^{m} (w_j * x_j)$$

The table in FIG. 5E shows the process and result of calculating entity words with the above formula, wherein the threshold value 0.5 in the table of FIG. 5E corresponds to the inverse number of b in the formula, that is, −b. Thus, the entity word obtained in the above example is: 建华(JIANHUA).

2. Specific process of identifying topic words based on the identified entity word "建华(JIANHUA)".

Step 1

It is necessary to segment and POS tag the document based on each identified entity word. The document after automatic segmentation and automatic POS tag processing is shown in FIG. 5C. It should be noted that since the automatic segmentation processing and POS tag processing have been performed during identifying entity words, it is generally unnecessary to re-perform the automatic segmentation and POS tagging processing in identifying topic words.

Step 2

Figures 5F, 5G:
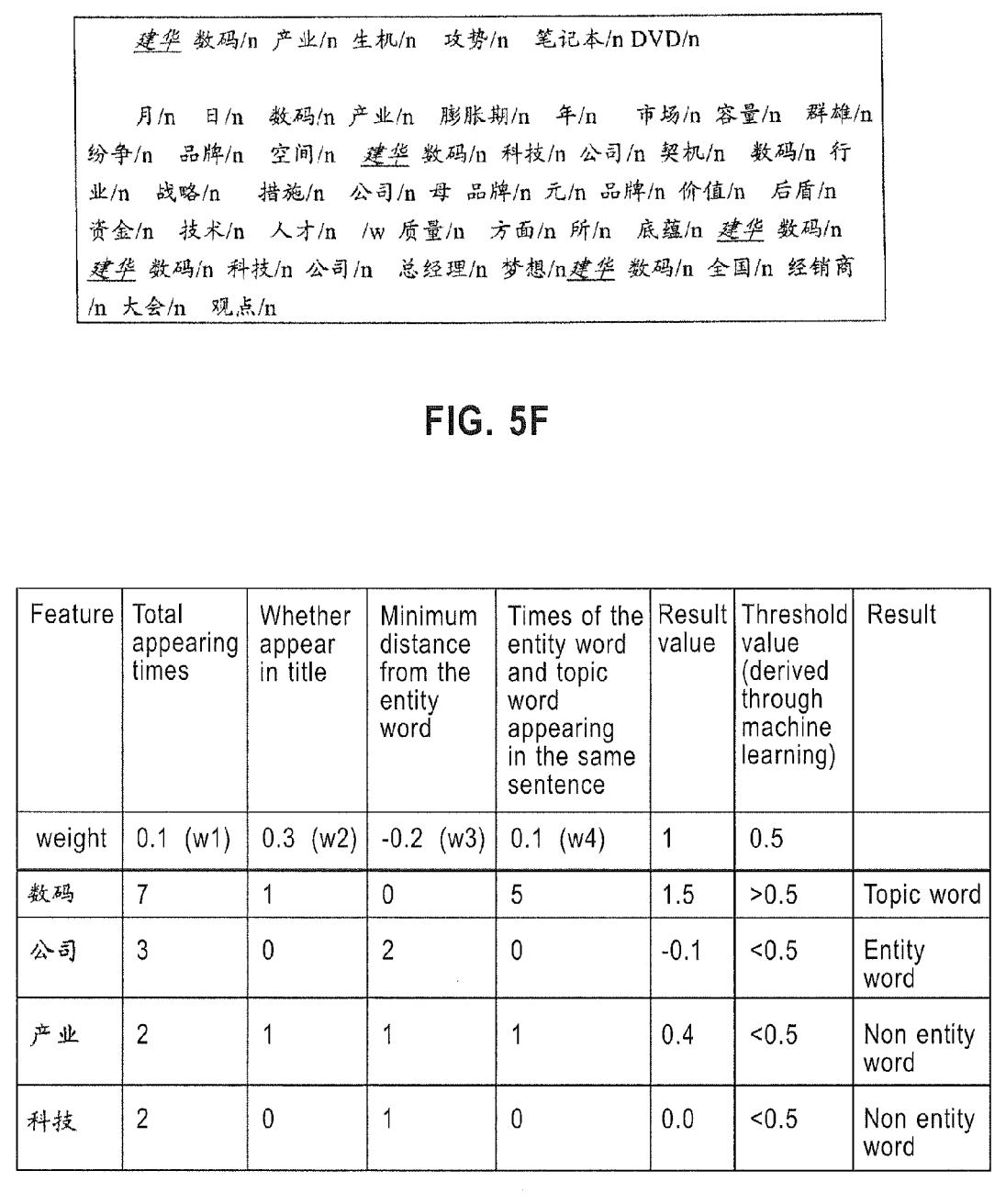

Selecting a focused POS class (typically a noun) and filtering out the stop words (for example 的(of), full stop(。), comma(,)) and the identified entity words in a document. The result of the above document subject to filter processing is shown in FIG. 5F (the slanted and underlined words are the filtered entity words). It should be noted that two candidate entity words "张三(Zhang San)" and "中山(Zhongshan)" have been filtered out and thus are not shown in FIG. 5F. "建华(JIANHUA)", in fact, has been filtered out. However, since the identified entity word "建华(JIANHUA)" has to be based on when identifying topic words, "建华(JIANHUA)" is shown slantingly and underlined in FIG. 5F.

Step 3

The FTD technology (derived through computer learning) is employed by considering parameters such as the distance of the residual words (i.e. the words left after all candidate entity words have been filtered out from the document) spaced away from the identified entity words, a frequency of the residual words and identified entity words appearing in the same sentence, and the times of the residual words appearing in the document, with the topic words being outputted.

For example, words with relatively high appearing frequency in the Chinese document are:

数码(Digital) once in the title, 6 times in the text
公司(Company) 3 times in the text
产业(Industry) once in the title, once in the text
科技(Technology) twice in the text For each residual word, a score is calculated based on the set weight value and feature vector $Y=\{y_1, y_2, \ldots, y_m\}$. The calculation formula is:

$$\text{score}(y) = c + \sum_{j=1}^{m} (w_j * y_j)$$

The table in FIG. 5G shows the process and result of calculating topic words with the above formula, wherein the threshold value 0.5 in the table of FIG. 5G corresponds to the inverse number of c in the formula, that is, −c. Thus, the topic word obtained in the above example is: 数码(Digital). Then, the entity word-topic word pair is "建华(JIANHUA)-数码(Digital)".

Note: words like "月(month)", "日(date)", and "年(year)" in document 1 are typically ranked with a lower score due to a too short length; the meaning expressed by a short word is typically very limited.

Hereinafter, an instance for identifying entity words in a specific English document and for identifying topic words based on the identified entity words is described:

1. Using FNER technology to realize identification of entity words

Step 1 Automatic POS Tagging

Assume a given English document is shown in FIG. 6A. The effect after automatic POS tagging with a program is shown in FIG. 6B, wherein /n indicates a noun, /v indicates a verb, /a indicates an adjective, and /m indicates a number. It should be noted that for an English document, automatic segmentation is unnecessary.

Step 2 Identifying Candidate Entity Words

As shown in FIG. 6C, the extracted candidate entity words include a company name "JIANHUA" determined by the neighboring TV, address names "Beijing" and "China" determined through the neighboring "in", and "of", which candidate entity words are shown in bold lines in FIG. 6C.

Step 3

For each candidate entity word, a series of features are extracted, for example: the frequency of the candidate entity word appearing in the article, whether the word appears in the title, whether the word's left neighboring and right neighboring words are candidate entity words, and the distribution of the candidate entity word in the article.

For example, the statistics on the features only considering frequency information is as follows:

JIANHUA: once in the title, twice in the text
China: twice in the text
Beijing: once in the text Step 4

Based on the candidate entity words as identified in step 3, FNER classification model, derived through machine learning, is applied to the feature vector $X=\{x_1, x_2, \ldots, x_m\}$ for each candidate entity word, thereby obtaining an estimate score (probability), and if the estimate score is greater than the set threshold, the candidate entity word is determined as a entity word.

The following formula is used to calculate the score (x) of each candidate entity word:

$$\text{score}(x) = b + \sum_{j=1}^{m} (w_j * x_j)$$

The table in FIG. 6D shows the process and result of calculating entity words with the above formula, wherein the threshold value 0.5 in the table of FIG. 6D corresponds to the inverse number of b in the formula, that is, –b. Thus, the entity word obtained in the above example is: JIANHUA.

2. Specific process of identifying topic words based on the identified entity word "JIANHUA".

Step 1

It is necessary to POS tag the document based on each identified entity word while unnecessary for automatic segmentation. The document after POS tagging processing is shown in FIG. 6B. It should be noted that since the POS tagging processing has been performed during identifying entity words, it is generally unnecessary to re-perform the POS tagging processing in identifying topic words.

Step 2

Selecting a focused POS class (typically a noun) and filtering out the stop words (for example "of") and candidate entity words in a document. The result of the above document subject to filter processing is shown in FIG. 6E (the slanted and underlined words are the filtered entity words). It should be noted that two candidate entity words "China" and "Beijing" have been filtered out and are thus not shown in FIG. 6E. "JIANHUA", in fact, has been filtered out. However, since the entity word "JIANHUA" has to be based on when identifying topic words, "JIANHUA" is shown slantingly and underlined in FIG. 6E.

Step 3

FTD technology, derived through computer learning, is employed by considering parameters such as the distance of the residual words (i.e. the words left after all candidate entity words have been filtered out from the document) spaced away from the identified entity words, a frequency of the residual words and identified entity words appearing in the same sentence, and the times of the residual words appearing in the document, with the topic words being outputted.

For example, words with relatively high appearance frequency in the English document are:

Home: once in the title, thrice in the text
Appliance: once in the title, thrice in the text
TV: once in the title, twice in the text
Outlet: once in the title, once in the text
Exhibition: once in the text For each residual word, a score is calculated based on the set weight value and feature vector $Y=\{y_1, y_2, \ldots, y_m\}$. The calculation formula is:

$$\text{score}(y) = c + \sum_{j=1}^{m} (w_j * y_j)$$

The table in FIG. 6F shows the process and result of calculating topic words with the above formula, wherein the threshold value 0.5 in the table of FIG. 6F corresponds to the inverse number of c in the formula, i.e. –c. Thus, the topic word obtained in the above example is: TV. Then, the entity word-topic word pair as identified in the English document is "JIANHUA-TV".

Through the above instances of identifying entity words from a Chinese document and an English document and identifying topic words based on the entity words, it is seen that regardless of the language of a document, it can be subject to operations of identifying entity words and topic words through the method and system of the present invention.

Figure 7:
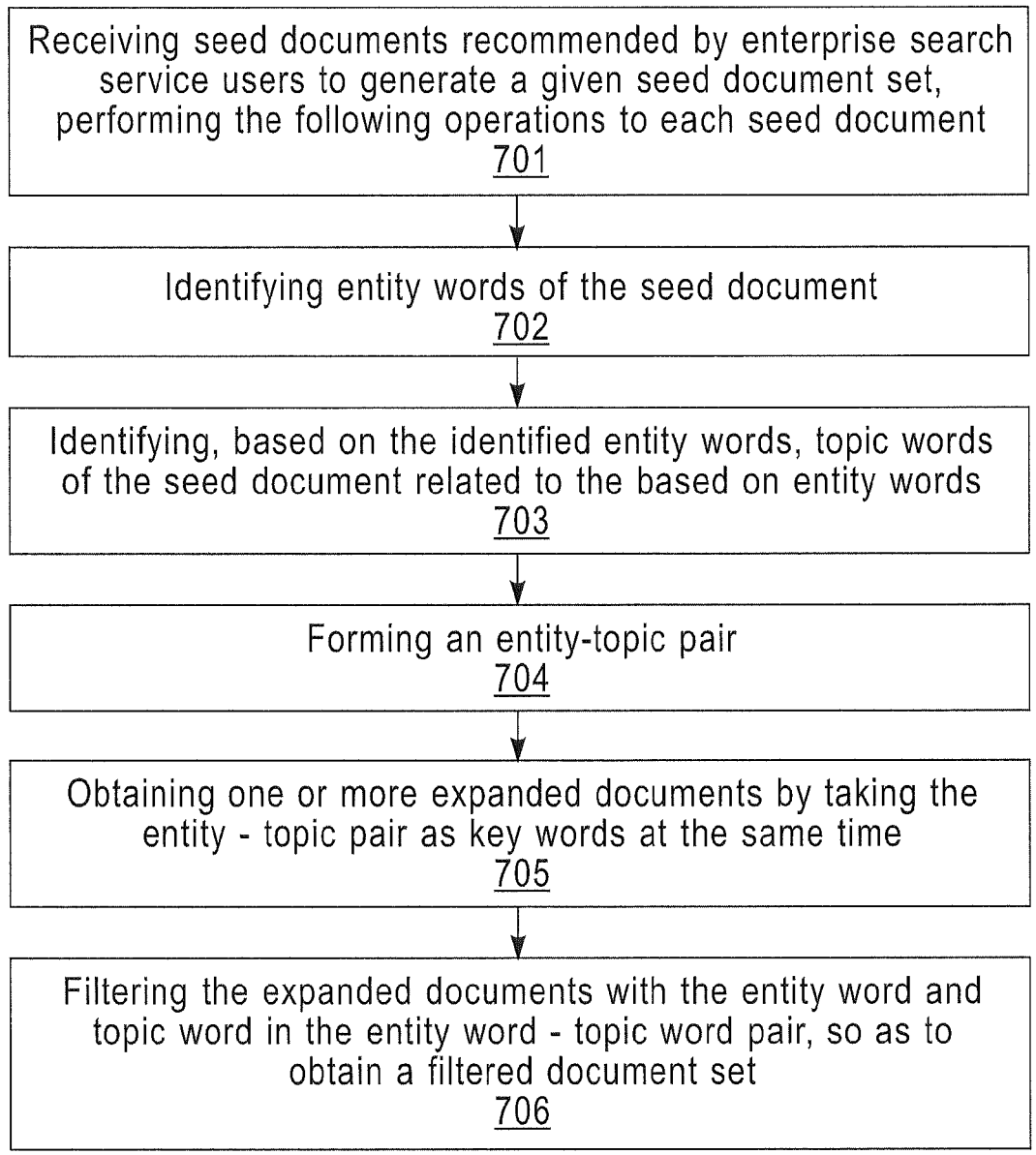
FIG. 7 shows a flow chart on the basis of the document processing method as shown in FIG. 1 and comprising steps of filtering the processed document.

FIG. 7 shows a flow chart on the basis of the document processing method as shown in FIG. 1 and including steps of filtering a processed document. FIG. 7 differs from FIG. 1 in the additions of step 701 and step 706. At step 701, a seed document recommended from an enterprise search service user is received to generate a seed document set. In an enterprise search service environment, the user, when obtaining a document which he thinks valuable and possibly helpful to the search of other user, may recommend the document to the data source storage center of an enterprise search service, which becomes a seed document. All seed documents recommended by users can form a seed document set. The preferred manner of executing a recommendation operation may be that the user imports the document which he thinks valuable and publishes the document in the search data source (seed document set) of the enterprise search system by clicking on the "recommend" button in the enterprise search system.

Steps 702-705 correspond to steps 101-104 in FIG. 1, respectively, and the detailed contents in the four steps have been introduced previously and will not be detailed here. Next, the expanded document set obtained by expansion is filtered at step 706, which corresponds to slim the expanded document set by deleting some inexpensive documents. The reason for such practice is to download all documents including key words for web search, such as entity word-topic word pairs, to form an expanded document set.

However, though many such new documents comprise these key words like entity word-topic word pairs, the focused entities and topics of the document per se are far different from the focused entities and topics of the enterprise search service user. In other words, the expanded document set formed only through the step 705 would comprise many "noises" (valueless documents or not focused documents of the user), since the search result precision of a general Internet search engine per se is limited.

A general search engine is a search based on key words. Thus, though the returned search result comprises the key words in search, they are not necessarily the topics of the article. Thus, it is required to search and download the key words of the new documents, that is, entity word-topic word pairs from the web, and then the expanded document set is filtered by use of the key words to form a filtered document set, so as to filter out the "noises" in the expanded document set, thereby improving the precision and accuracy of the seed document set. It should be understood that the step 706 of filtering the expanded document set is not obligatory, because whether to remove "noises" possibly included in the expanded document set may be determined based on different demands on document expansion precision. Through the method shown in FIG. 7, the new documents can be automatically downloaded from the web to thereby expanding the documents, and the downloaded new documents may be filtered to guarantee the precision and accurateness of document expansion, which will not excessively consume storage resources.

It should be noted that, though in FIG. 7, the step of filtering documents is performed to the documents in the expanded document set which is generated at step 104 in FIG. 1, and the entity word-topic word pair used for filtering is the entity word-topic word pair generated at step 103 as shown in FIG. 1, those skilled in the art may appreciate that the object for "filter" may be any document. A document set with a big scope may be artificially given, for example it is limited that all documents stored in a memory device are documents required for filter. Alternatively, mass documents may be obtained with a certain limitation condition such as key words or without any limiting condition through a network such as Internet, Ethernet, local area network inside an enterprise, metropolitan area network, or radio communication network. A document set including these documents may act as a set of candidate documents to be filtered. Alternatively, users of enterprise search may recommend too many documents to the enterprise search system. In order to remove some less valuable recommended documents, the expansion is not performed to these recommended documents like the process as shown in FIG. 7, but these recommended documents are filtered by given entity word-topic word pairs.

Figure 7A:
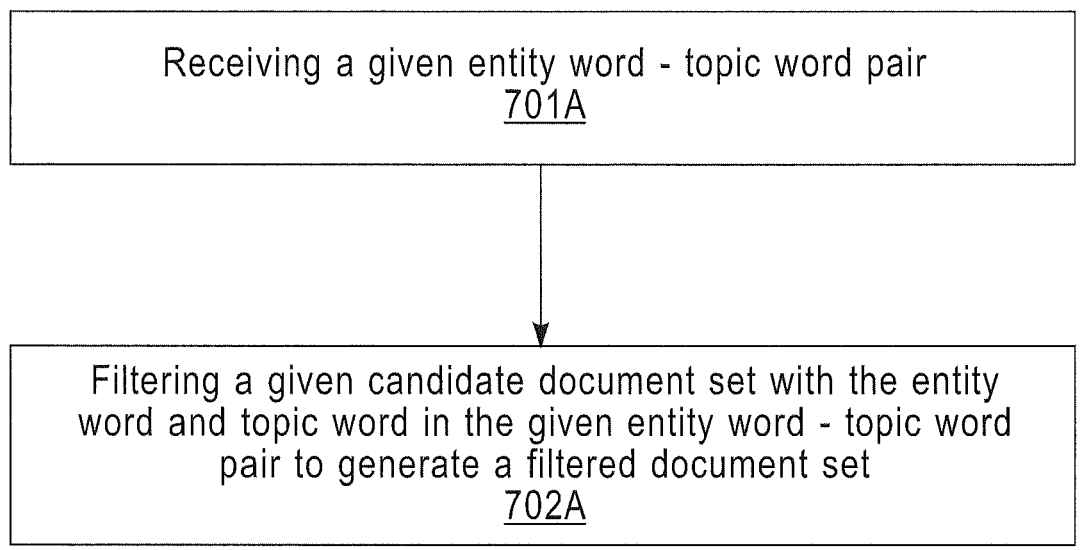
FIG. 7A shows a flow chart of a document processing method for filtering a given candidate document set with a given entity word-topic word pair.

It should be emphasized that a candidate document set is a document set comprising one or more candidate documents, wherein each candidate document is required for filter operation. As a preferred embodiment, such candidate document set may be an expanded document set generated at step 104 in accordance with the steps as shown in FIG. 1. In other words, a part or all of the expanded documents in the expanded document set are candidate documents required for filter. Alernatively, the candidate document set as shown in FIG. 7A is a subset of the expanded document set as shown in FIG. 1, or the candidate document set and the expanded document set have intersection.

If a document is not required for filter, then the document would not be a candidate document and thus is not comprised in the candidate document set, independent of whether the document is in the expanded document set generated at step 104 as shown in FIG. 1, or the document be physically stored in a same memory device with other candidate documents or they be obtained in a same manner. Steps 701-705 as shown in FIG. 7 are not necessary steps, because the "entity word-topic word pair" as a filter basis may be a given entity word-topic word pair in various manners (for example, given by manual input, given remotely through a network, or given by selecting key words from any document with certain criteria), but not the entity word-topic word pair formed by identifying entity words and topic words in a seed document at step 103 as shown in FIG. 1.

Those skilled in the art may directly use a given entity word-topic word pair to filter any candidate document set regardless of the source of the any document set. The flow chart as shown in FIG. 7 may also be like FIG. 7A: Step 701A—giving an entity word-topic word pair; step 702A—giving a candidate document set; and step 703A—filtering the candidate document set with the entity words and topic words in the given entity word-topic word pair to generate a filtered document set. FIG. 7A is related to FIG. 7 in: the given entity word-topic word at step 701A may come from the entity word-topic word pair formed at step 704 of FIG. 7, and the candidate document given at step 702A may be the seed document at step 701 of FIG. 7. All entities in all the entity word-topic word pairs received at step 701A may form an entity word set, while for each entity word in the entity word set, all topic words corresponding to the entity word form a topic entity set corresponding to the entity word, and the "corresponding" here refers to a correspondence relationship embodied through a entity word-topic word pair.

Figure 8:
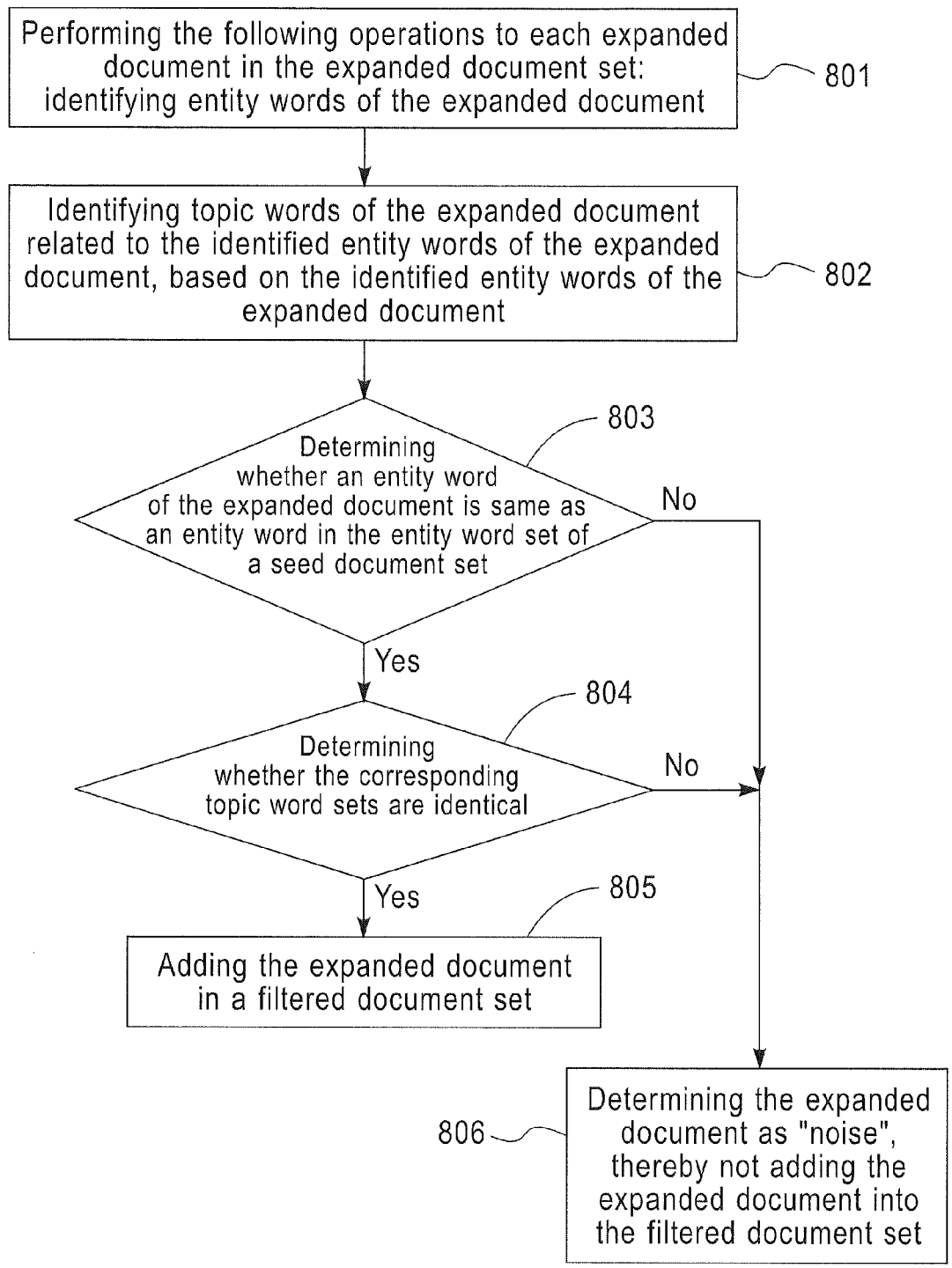
FIG. 8 shows a flow chart of a method of filtering an expanded document set according to an embodiment of the present invention.

FIG. 8 shows a flow chart of a method of filtering an expanded document set according to an embodiment of the present invention. For each expanded document in the expanded document set, steps 801-806 are executed. In other words, filtering the whole expanded document set is implemented by filtering each expanded document. First, the entity words in the expanded document are identified at step 801, and then the topic words of the expanded documents related to the based entity words are identified at step 802 based on the identified entity words. The manner of identifying entity words and topic words of the expanded documents in the expanded document set at steps 801 and 802 is identical to the manner of identifying entity words and topic words of a seed document in a seed document set. For details, refer to FIG. 2, FIG. 3 and the corresponding literal descriptions, which will not be detailed here.

After the entity words and topic words of the expanded document are identified, at step 803, the entity words identified in the expanded document are compared with the entity words in the entity word set of the seed document set to determine whether there exist a entity word in the entity word set in the seed document set which is same as the entity words identified in the expanded document at step 801, and if existed, the process proceeds to a determining step 804; if none of the entity words in the entity word set in the seed document set is same as to the entity words of the identified expanded document at step 801, then at step 806, it is determined that the documents in the expanded document set are required to remove "noises" therefrom, thereby not adding the documents into a filtered document set. The so-called entity word set in a seed document set refers to a set of all identified entity words after performing operation to each seed document in the seed document set at steps 101-104 as shown in FIG. 1.

It should be noted that there is no absolute execution sequence for step 802 and step 803. The determining of step 803 may be performed after the entity words and topic words of the expanded document are identified first, or the determining of step 803 is directly performed after the entity words of the expanded document are identified, and then after the determining ends, the step 802 is further performed to identify out the topic words if necessary.

At step 804, it is determined whether the topic word in the expended document identified based on the entity word is identical to a topic word identified based on a same entity word in the entity word set of the seed document set. If there is such topic word in the seed document set, the process proceeds to step 805 to add the expanded document into the filtered document set; and otherwise, the process proceeds to step 806 to determine that the expanded document is required to filter out "noises" therefrom, thereby not adding the expanded document into the filtered document set. To sum up, by the method of filtering an expanded document set as shown in FIG. 8, the objective of removing "noisy" expanded documents in the expanded document set can be achieved, thereby improving the precision of expanding the seed document set.

Apparently, in an enterprise search service scenario, a seed document set and a filtered document set are both document sets in an enterprise search service data source, available for search by enterprise search users, while the expanded document set, due to presence of "noise", is not a document set in an enterprise search service data source. In the case where it is unnecessary to filter out the noises in the expanded document set, that is, the requirement on the precision of expanding documents is not high, since there is no filtered document set, the seed document set and the expanded document set are document sets in the enterprise search service data source.

Figure 8A:
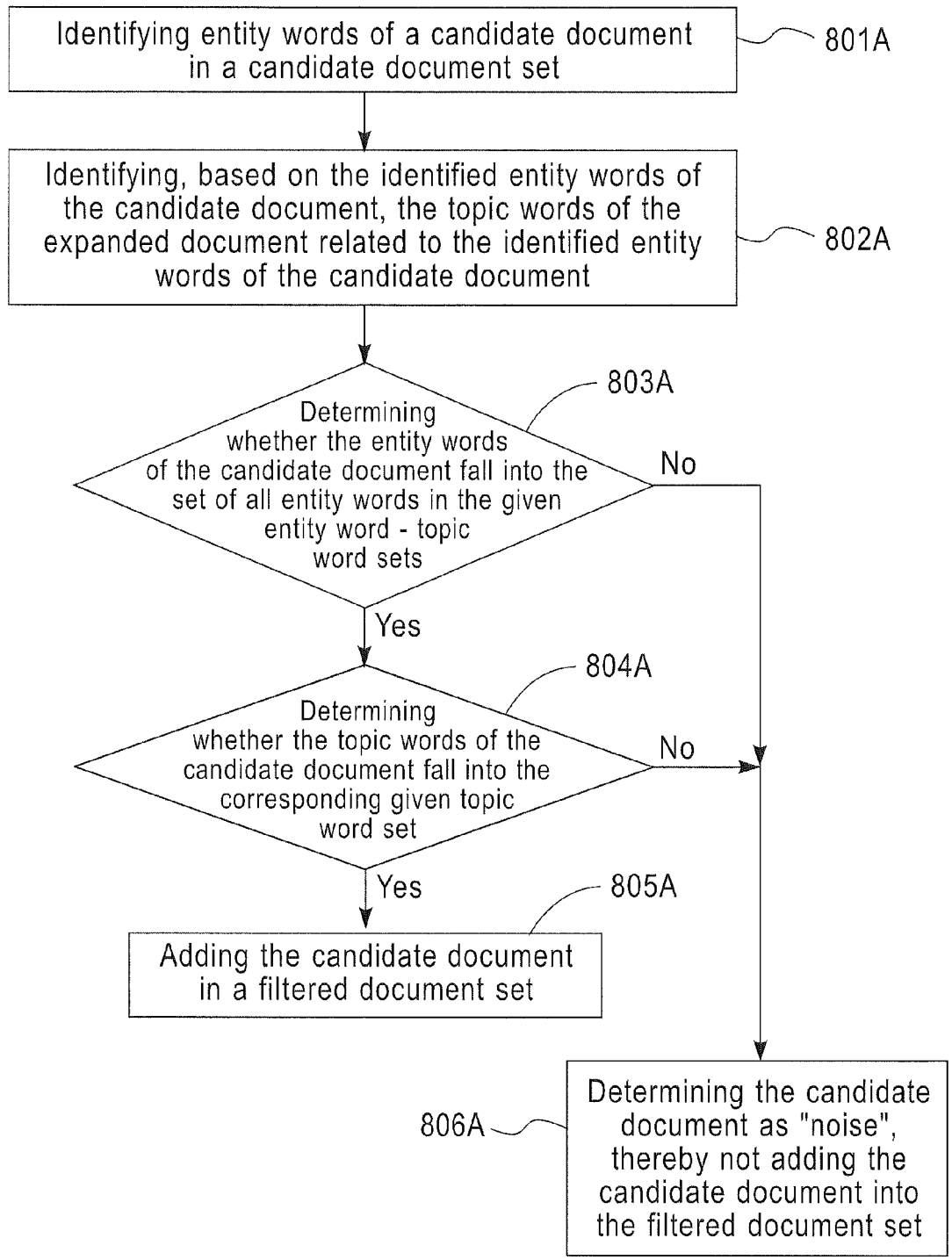
FIG. 8A shows a detailed flow chart according to filtering steps in the flow chart shown in FIG. 7A.

Though FIG. 8 shows detailed steps of filtering an expanded document set generated at step 104 as shown in FIG. 1, it is apparent that the steps as shown in FIG. 8 are likewise applicable to the process of filtering a candidate document set in the case of the given entity word-topic word pair as shown in FIG. 7A, as long as the "expanded document" in respective step of FIG. 8 is replaced with "candidate document", and the "entity word set in a seed document set" is replaced with the "entity word set of a given entity word-topic word pair." For details, refer to FIG. 8A.

Figure 9:
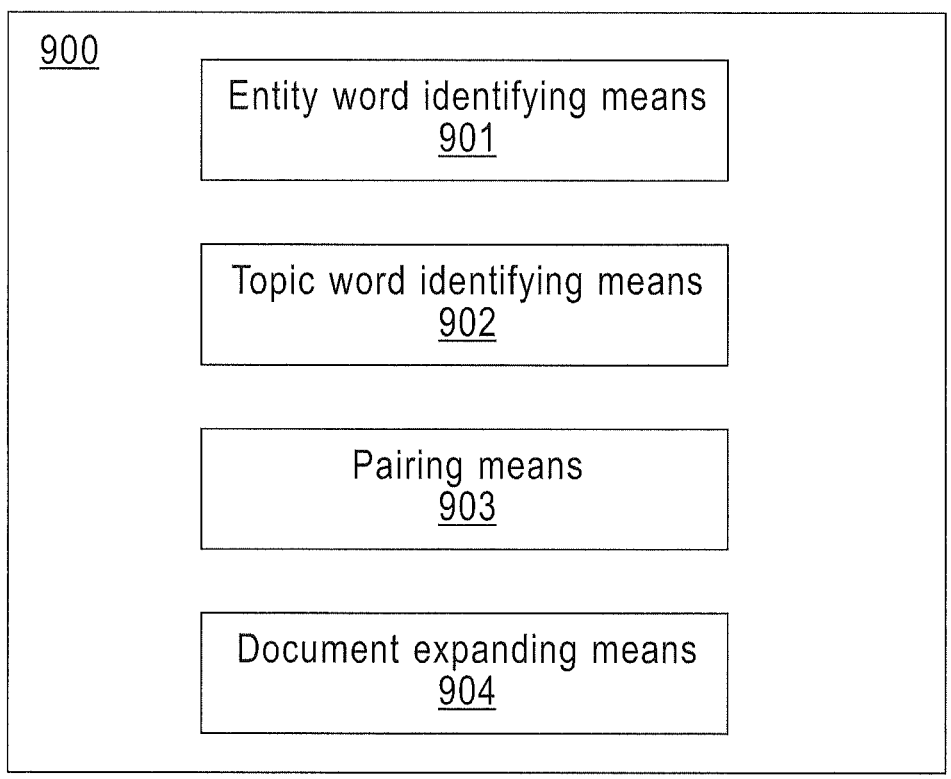
FIG. 9 shows a structural diagram of a document processing system according to the document processing method as shown in FIG. 1.

FIG. 9 shows a structural diagram of a document processing system according to the present invention. The system is generally indicated by 900 in FIG. 9. Specifically, the system as shown in FIG. 9 is configured to perform the following operations on each seed document in a seed document set to thereby generate an expanded document set. The system 900 comprises entity word identifying means 901, topic word identifying means 902, pairing means 903, and document expanding means 904. The entity word identifying means 901 identifies entity words in a seed document. The topic word identifying means 902 is coupled to the entity word identifying means 901 and is configured to identify topic words of the seed document based on the identified entity words. The paring means 903 pairs the entity words identified by the entity word identifying means 901 and the topic words identified by the topic word identifying means 902 based on the entity words into entity word-topic word pairs.

The document expanding means 904 searches and downloads new documents through the network by taking the entity word and topic word in the entity word-topic word pair paired by the pairing means 903 as key words at the same time, thereby forming an expanded document set formed from the expanded documents. It should be pointed out that, means 901-904 in the system as shown in FIG. 9 correspond to steps 101-104 in the method as shown in FIG. 1, respectively, and thus their respective specific implementation process will not be detailed here. Those skilled in the art may appreciate that the seed document set may be automatically expanded with the system as shown in FIG. 9, so as to form an expanded document set. Under the environment of enterprise search service, the content of a search data source is automatically expanded from the original seed document set to a sum of the seed document set and the expanded document set.

Figure 10:
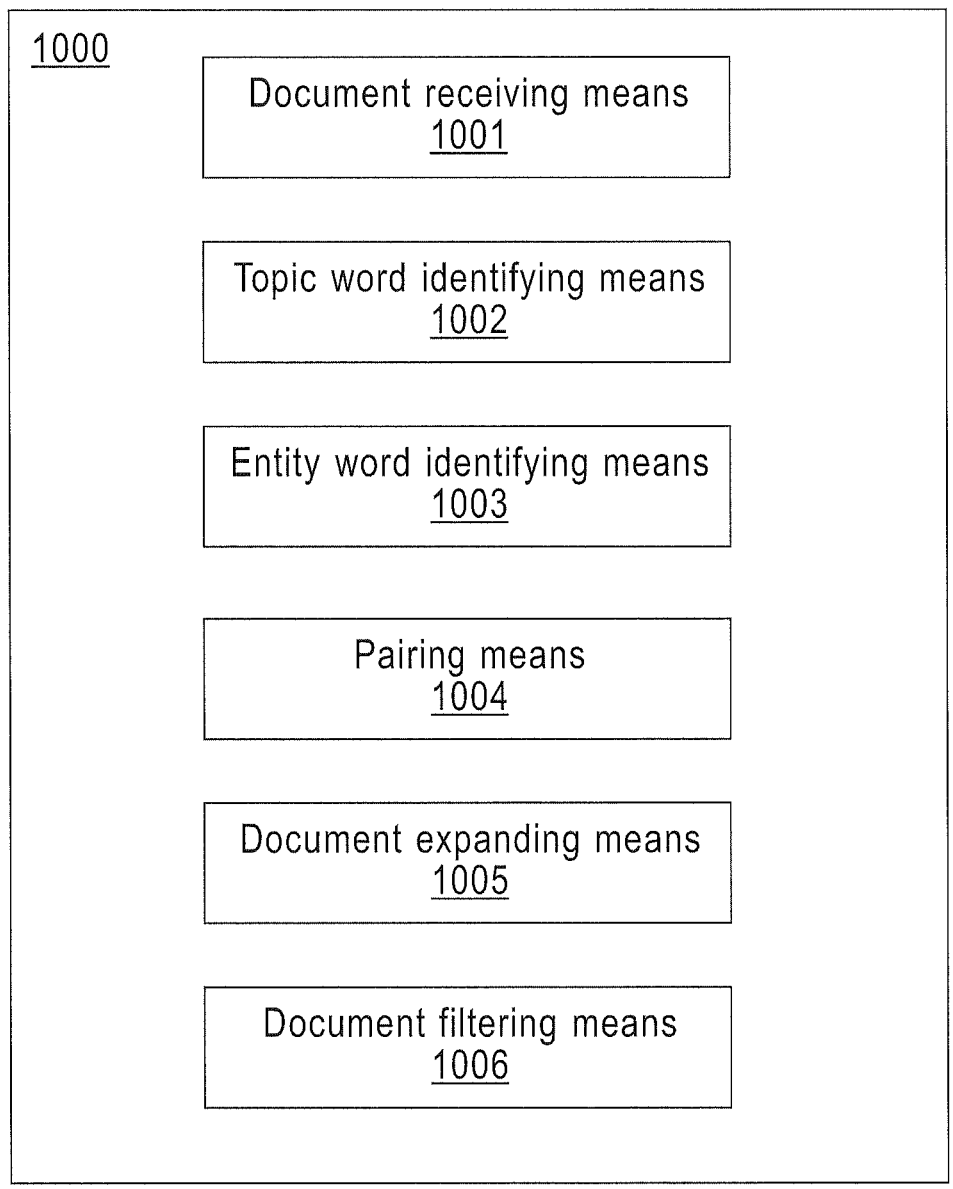
FIG. 10 shows a structural diagram of a document processing system according to the document processing methods as shown in FIG. 7 and FIG. 8.

FIG. 10 shows a structural diagram of a document processing system according to a preferred embodiment of the present invention. The system is generally indicated by 1000 in FIG. 10. Specifically, the system as shown in FIG. 10 comprises document receiving means 1001, entity word identifying means 1002, topic word identifying means 1003, pairing means 1004, document expanding means 1005, and document filtering means 1006. Different from the system as shown in FIG. 9, the system of FIG. 10 adds the document receiving means 1001 and the document filtering means 1006.

The document receiving means 1001 receives recommended documents to form a seed document set, and the document filtering means 1006 filters the documents in the expanded document set obtained from the document expanding means 1005 to form a filtered document set, thereby removing the "noises" in the expanded document set and improving precision of expanding the seed document set. It should be pointed out that means 1001-1006 of the system of FIG. 10 correspond to steps 701-706 of the method as shown in FIG. 7, respectively, while the document filter means 1006 may be further configured to implement steps 801-806 in the method as shown in FIG. 8.

Figure 11:
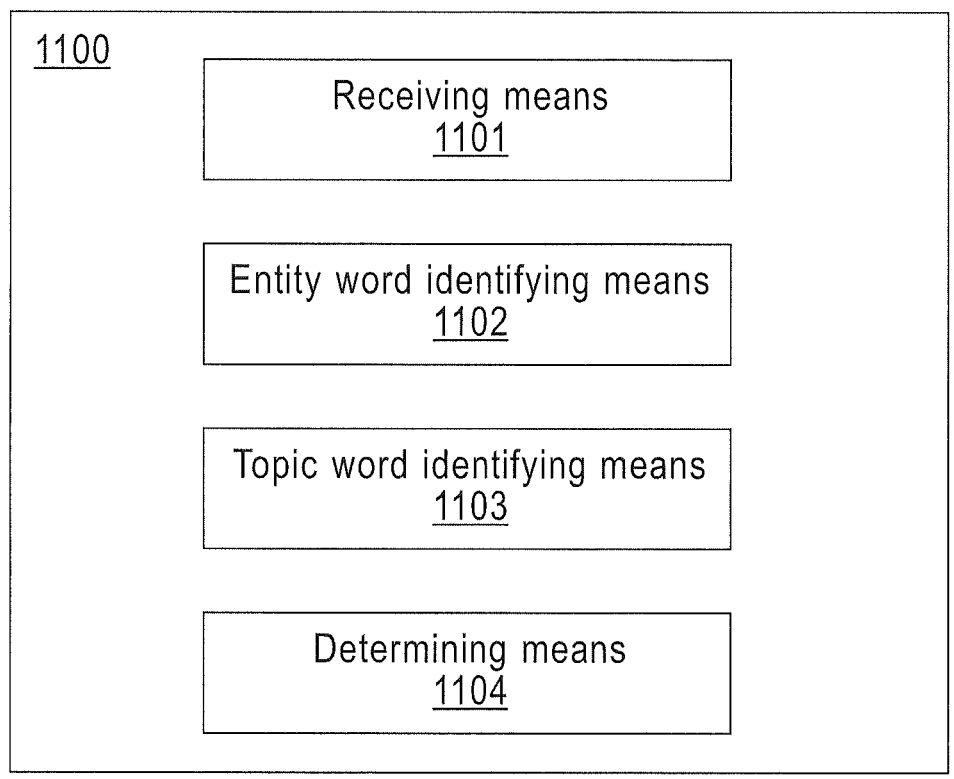
FIG. 11 shows a structural diagram of a document processing system according to the document processing methods as shown in FIG. 7A and FIG. 8A.

FIG. 11 shows a structural diagram of a document processing system according to the document processing methods as shown in FIG. 7A and FIG. 8A; The system as shown in FIG. 11 is generally indicated by 1100, and specifically the system 1100 comprises receiving means 1101, entity word identifying means 1102, topic word identifying means 1102, and determining means 1104. The receiving means 1101 corresponds to the step 701A as shown in FIG. 7A, for receiving a given entity word-topic word pair. The entity word identifying means 1102 corresponds to the step 801A as shown in FIG. 8A, for identifying the entity words of each candidate document in a given candidate document set. The topic identifying means 1103 corresponds to the step 802A as shown in FIG. 8A, for identifying, based on the identified entity word, the topic words of the candidate document related to the based entity words. The determining means 1104 corresponds to steps 803A-805A as shown in FIG. 8A, for determining whether to add the candidate document into the filtered document set.

Figure 12:
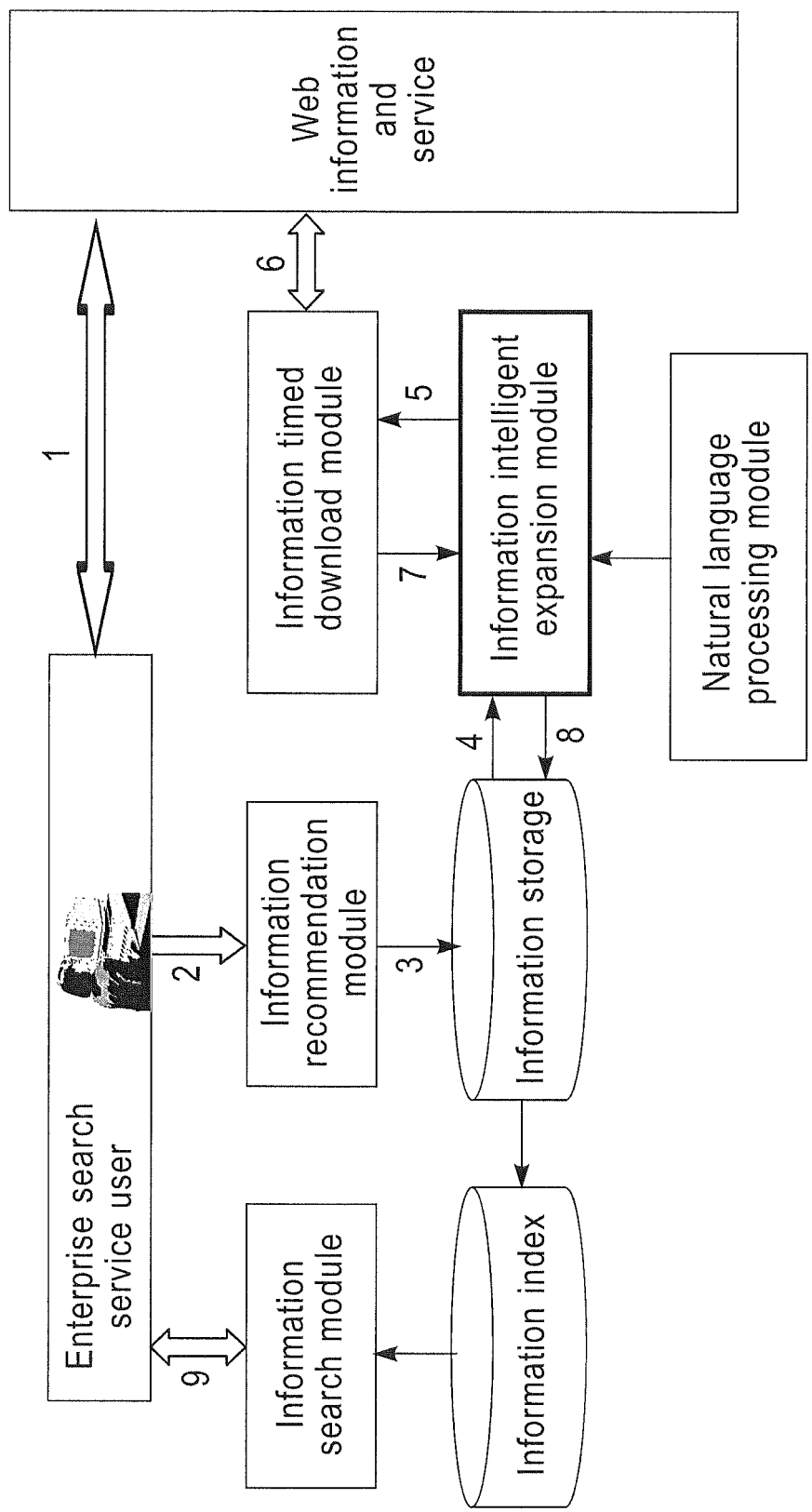
FIG. 12 shows a structural diagram of an implementation of an enterprise search service system according to a method of the present invention.

FIG. 12 shows a structural diagram of an implementation of an enterprise search service system according to a method of the present invention. Hereinafter, each arrow marked in FIG. 12 will be explained in detail. Arrow 1 indicates that users of an enterprise search service obtain a document in their interest through web information and service, but not through the enterprise search service system per se. The connection between web information and service and enterprise search service users as shown in FIG. 12 may use a routine network connection such as token ring, Ethernet, WiFi, or other routine communication standard. Besides, the network may comprise any kind of network including Internet, wide area network (WAN), local area network (LAN), and virtual private network (VPN).

If a client communicates with a server via Internet, the connection can be provided based on the traditional TCP/IP socket-based protocol and the client would establish a connection with the server through an Internet service provider. Arrows 2 and 3 indicate that users of the enterprise search service recommend the valuable documents which they obtain through the web information and service to an information memory device of the enterprise search service system via an information recommendation module. The information memory device is a memory device for storing the search data source of the enterprise search service.

Arrow 4 indicates that an information intelligent expansion module receives the documents recommended by users stored in the information memory device to perform expanding operation to these documents. The information intelligent expansion module comprises a natural language processing module for performing FNER entity word recognition and FTD topic word detection. Arrow 5 indicates that the information intelligent expansion module, after the identified entity words and topic words form pairs, sends them to an information timed download module which submits search and download requests to the web information and service according to a predetermined time interval as shown in arrow 6, and downloads the expanded new documents.

Arrow 7 indicates that the information timed download module sends the downloaded new documents to the information intelligent expansion module which filters these new documents to remove the "noises" therein, and then the information intelligent expansion module sends the remained new filtered documents to the information memory device, while these new documents and the previously user recommended documents together become the search data source of the enterprise search service.

Filtering is shown in FIG. 9, where enterprise search service users may search the desired documents from the expanded search data source stored in the information memory device via the information search module. It can be seen from the system of FIG. 11 that by introducing the information intelligent expansion module and the information timed download module, not only new documents can be automatically downloaded from the web as timed to thereby implement document expansion, but also the downloaded new documents can be filtered to thereby guarantee the precision and accuracy of document expansion, which will not excessively consume the memory resources of the information memory device of the enterprise search service system.

Although the above description on the preferred embodiments, those skilled in the art should appreciate that the above system, device and method may be implemented by using a computer executable instruction and/or by being included in a processor control code. For example, such code is provided on a magnetic diskette, carrier medium of CD or DVD-ROM, a programmable memory such as read-only memory (firmware) or data carrier such as an optical or electronic signal carrier. The device, the server and units thereof according to the present embodiments may be implemented by a Super-Large Scale Integration or a gate array, a semiconductor such as logic chip and transistor, or hardware circuitry of a programmable hardware device such as field-programmable gate array or a programmable logic device and may also be implemented by combination of the above hardware circuitry and software.

Although the system and method of the present invention of utilizing remote application to process local document have been described in detail with reference to the preferred embodiments, the present invention is not limited hereto. Those skilled in the art can make various alterations, replacements and modifications to the present invention without departing from the spirit and scope of the present invention under the teaching of the present description. It should be understood that all such alternations, replacements and modifications still fall within the scope of protection of the present invention.

What is claimed is:

1. A method for expanding a seed document in a seed document set, wherein the seed document set comprises at least one seed document, the method comprising:

identifying one or more entity words of the seed document in memory by a processor, wherein the one or more identified entity words are words indicating focused entities of the seed document;

identifying by the processor, based on each of the one or more identified entity words of the seed document, one or more topic words related to each of the one or more identified entity words, the one or more identified topic words located in the seed document;

forming, by the processor, an entity word-topic word pair from each of the one or more identified topic words and each of the one or more identified entity words upon which each of the one or more identified topic words is identified; and obtaining one or more expanded documents by the processor by taking the entity word and topic word in each entity word-topic word pair as key words for web searching at the same time, wherein the expanded documents comprise not only the entity word in the each entity word-topic word pair but also the topic word in the each entity word-topic word pair.

2. The method according to claim 1, wherein the identifying by the processor, based on the each of the one or more identified entity words of the seed document, one or more topic words related to each of the one or more identified entity words further comprises:

identifying the one or more topic words based on a distance between words other than the one or more identified entity words in the seed document.

3. The method according to claim 1, wherein the identifying by the processor, based on the each of the one or more identified entity words of the seed document, one or more topic words related to each of the one or more identified entity words further comprises:

identifying the one or more topic words based on a frequency of other words than the one or more identified entity words in the seed document and the one or more identified entity words upon which each of the one or more identified topic words is identified appearing in a same sentence in the seed document.

4. The method according to claim 1, further comprising receiving a recommended seed document to form the seed document set.

5. The method according to claim 1, wherein one or more entity words of the seed document are identified with focused named entity recognition (FNER) technology.

6. The method according to claim 5, wherein one or more topic words of the seed document are identified with focused topic detection (FTD) technology using the FNER technology as a basis for identifying the one or more topic words.

7. A system for expanding a seed document in a seed document set, wherein the seed document set comprises at least one seed document, the system comprising:

entity word identifying means for identifying one or more entity words of the seed document in memory by a processor, the one or more identified entity words being words indicating focused entities of the seed document;

topic word identifying means for identifying by the processor, based on each of the one or more identified entity words of the seed document, one or more topic words related to each of the one or more identified entity words, the one or more identified topic words located in the seed document;

pairing means for forming, by the processor, an entity word-topic word pair from each of the one or more identified topic words and each of the one or more identified entity words upon which each of the one or more identified topic words is identified; and document expanding means for obtaining one or more expanded documents by the processor by taking the entity word and topic word in the each entity word-topic word pair as key words for web searching at the same time, the expanded documents comprising not only the entity word in each entity word-topic word pair but also the topic word in the each entity word-topic word pair.

8. The system according to claim 7, wherein the entity word identifying means for identifying the one or more entity words of the seed document includes focused named entity recognition (FNER) technology.

9. The system according to claim 8, wherein the topic word identifying means is configured to identify the one or more topic words of the seed document with focused topic detection (FTD) technology using the FNER technology as a basis for identifying the one or more topic words.

* * * * *